May 11, 1937. G. F. YAGER ET AL 2,080,157
TURNING AND FACING MACHINE
Filed Dec. 12, 1933 15 Sheets-Sheet 1

INVENTOR>
George F. Yager,
Oliver J. Heath
BY
ATTORNEYS

May 11, 1937. G. F. YAGER ET AL 2,080,157
TURNING AND FACING MACHINE
Filed Dec. 12, 1933 15 Sheets-Sheet 3

Fig. 3.

INVENTORS
George F. Yager
Oliver J. Heath
BY
ATTORNEYS

Fig. 4.

May 11, 1937.    G. F. YAGER ET AL    2,080,157
TURNING AND FACING MACHINE
Filed Dec. 12, 1933    15 Sheets-Sheet 5

INVENTORS
George F. Yager
Oliver J. Heath
BY
ATTORNEYS

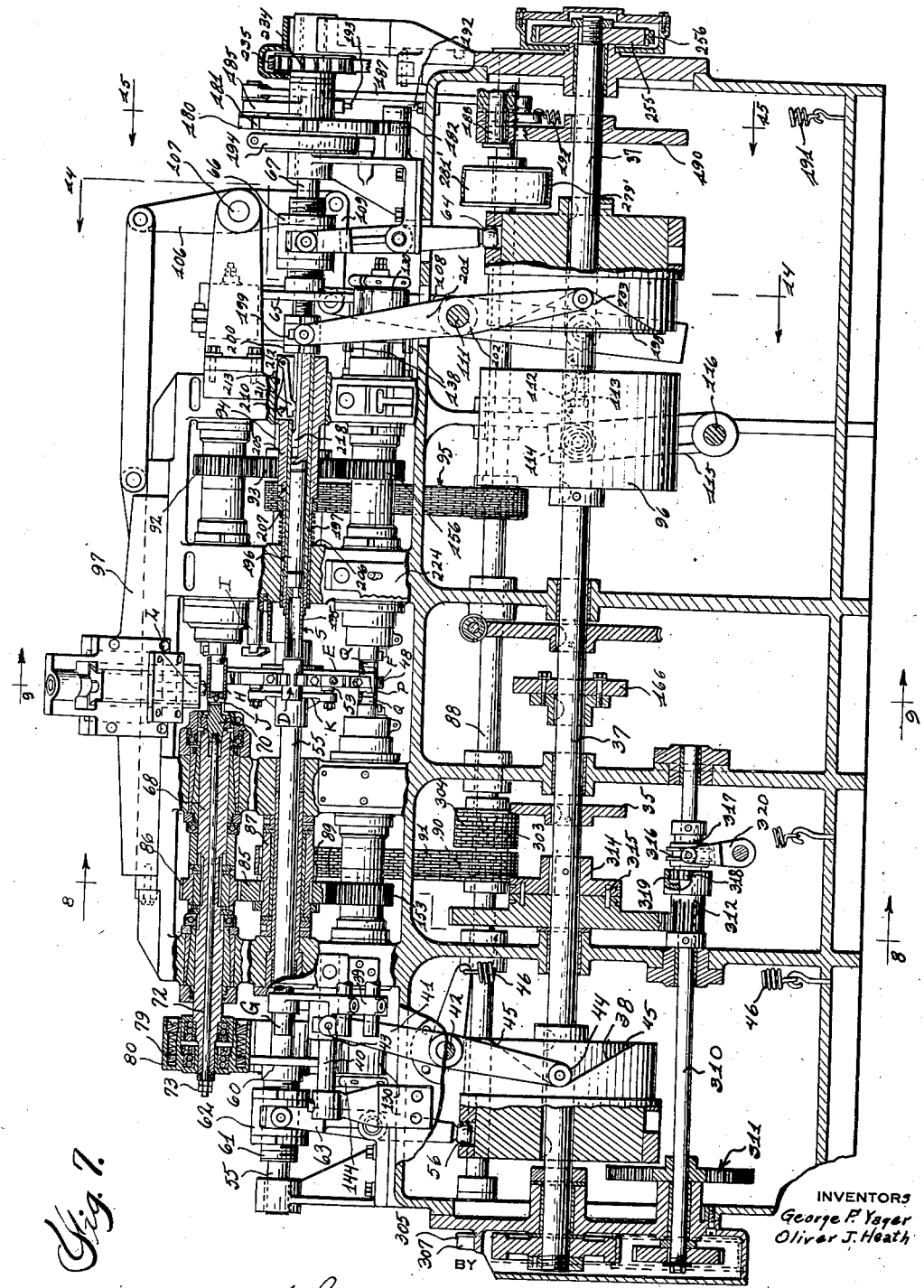

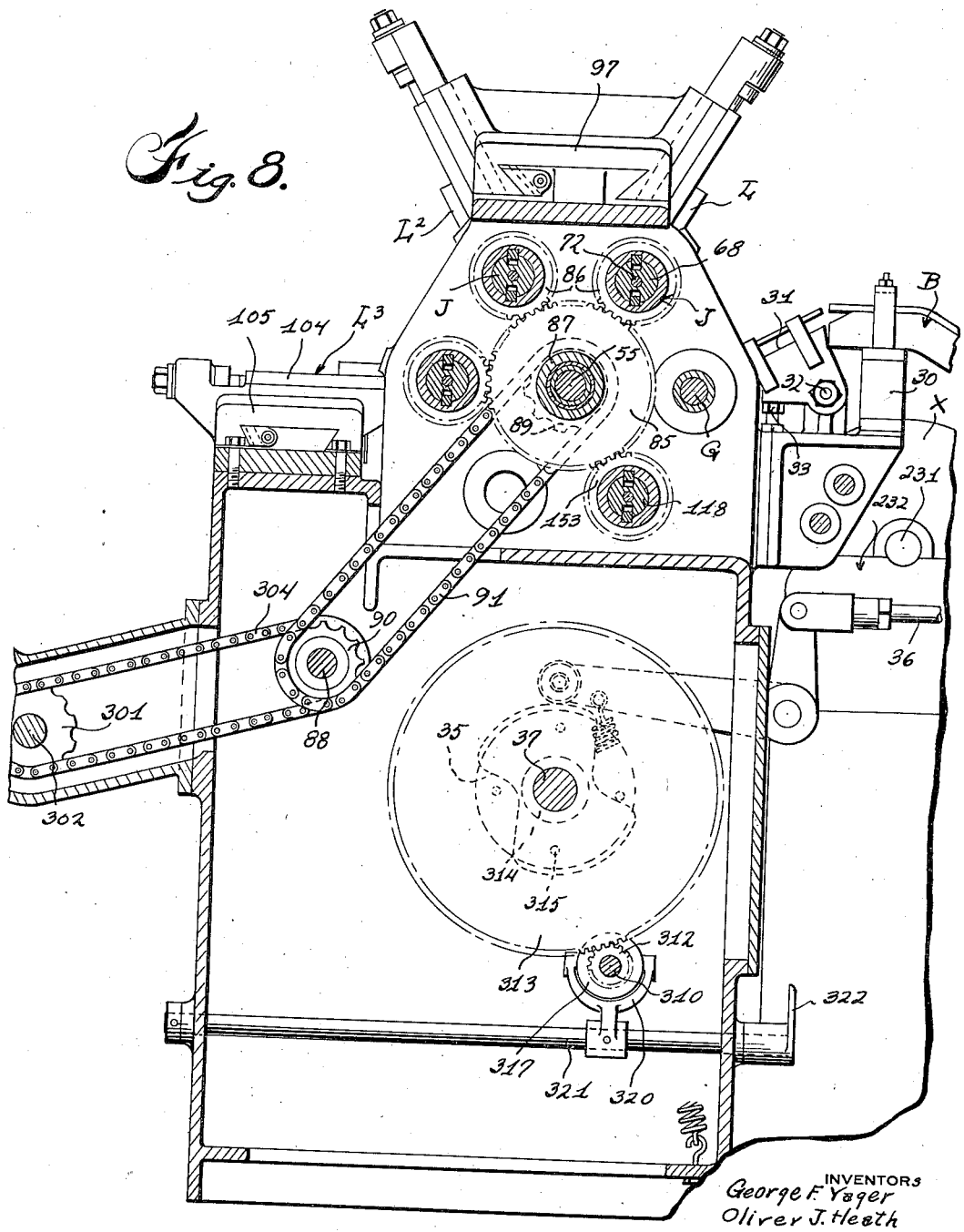

May 11, 1937.  G. F. YAGER ET AL  2,080,157
TURNING AND FACING MACHINE
Filed Dec. 12, 1933  15 Sheets-Sheet 9
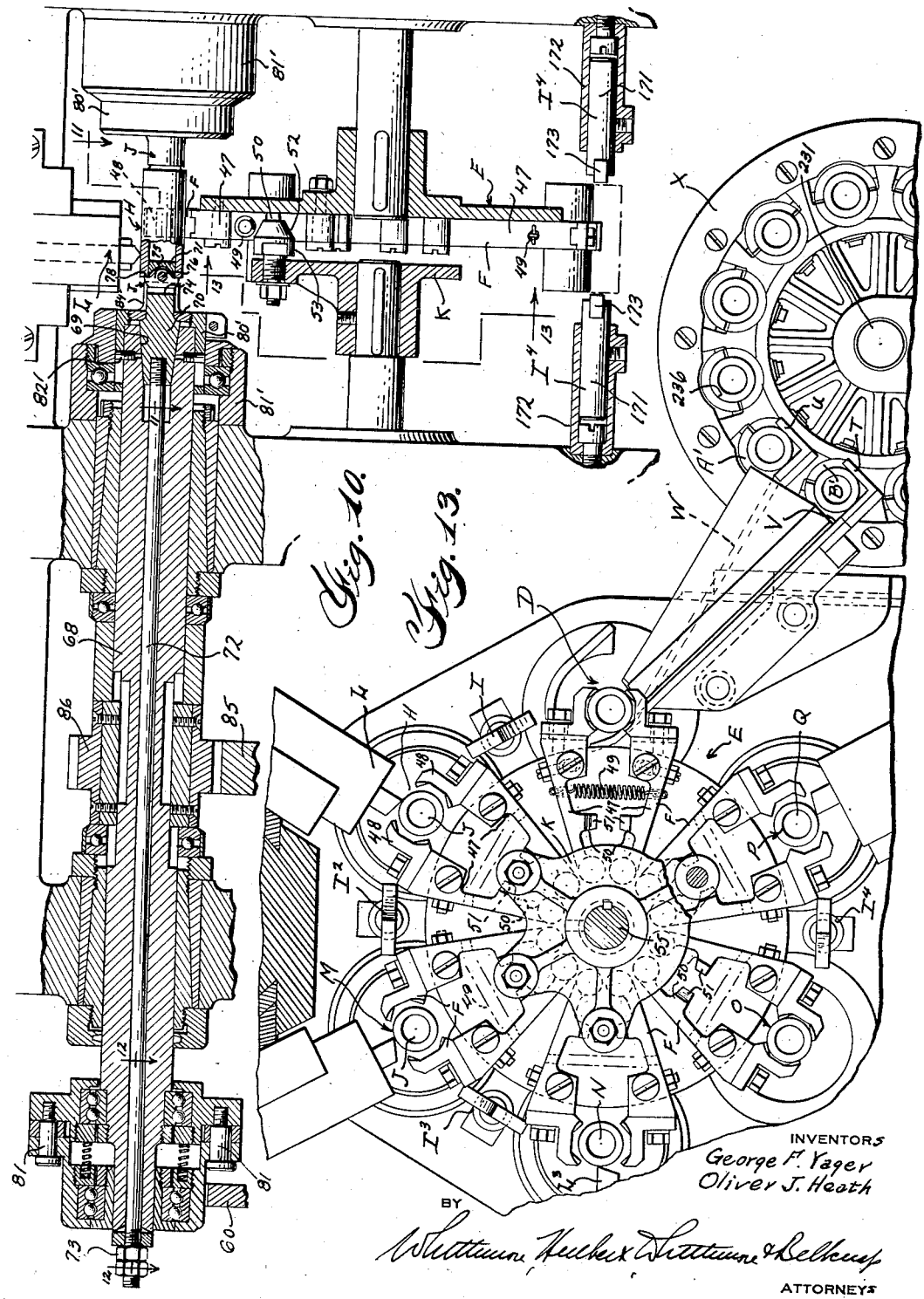
INVENTORS
George F. Yager
Oliver J. Heath
BY
ATTORNEYS

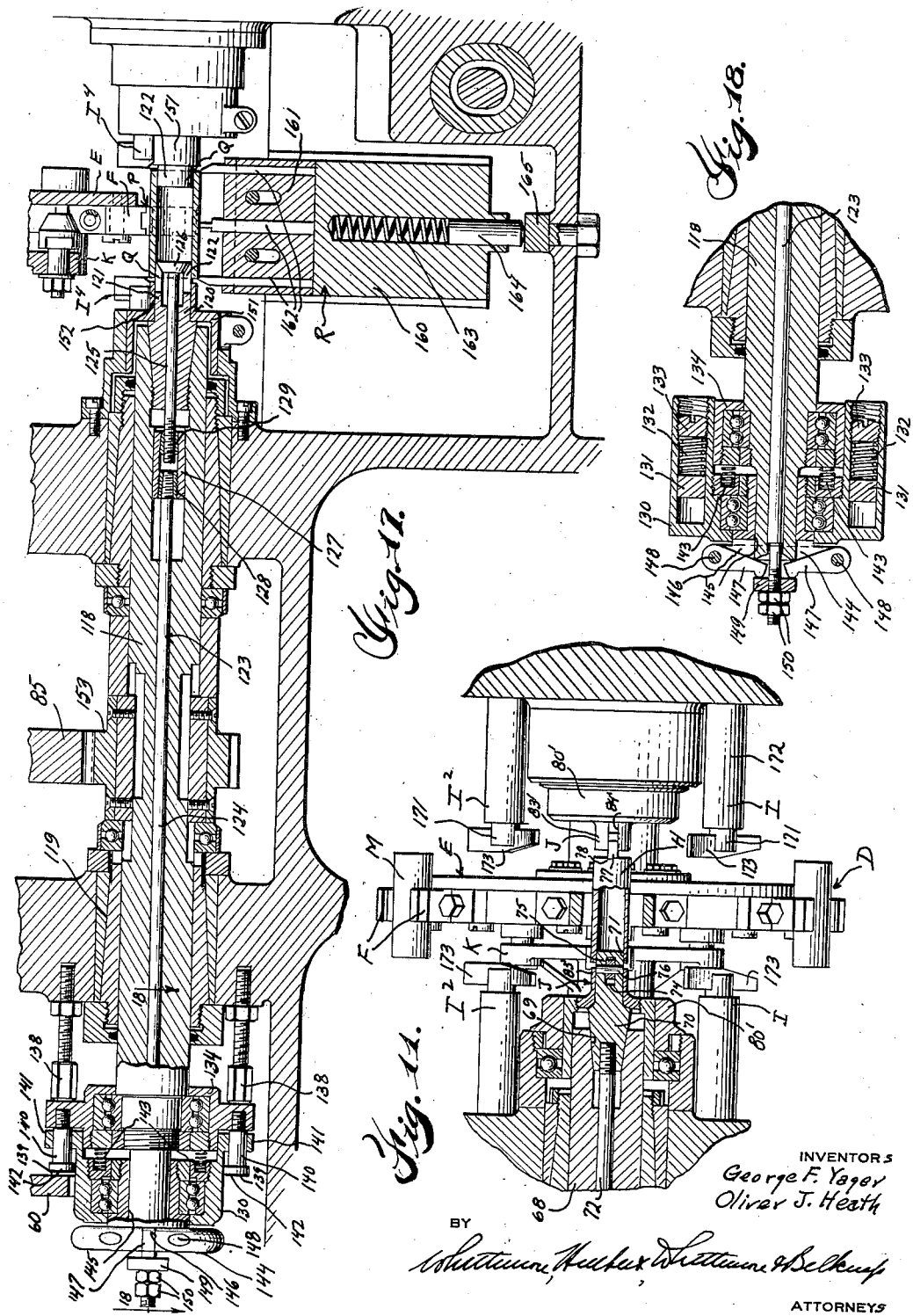

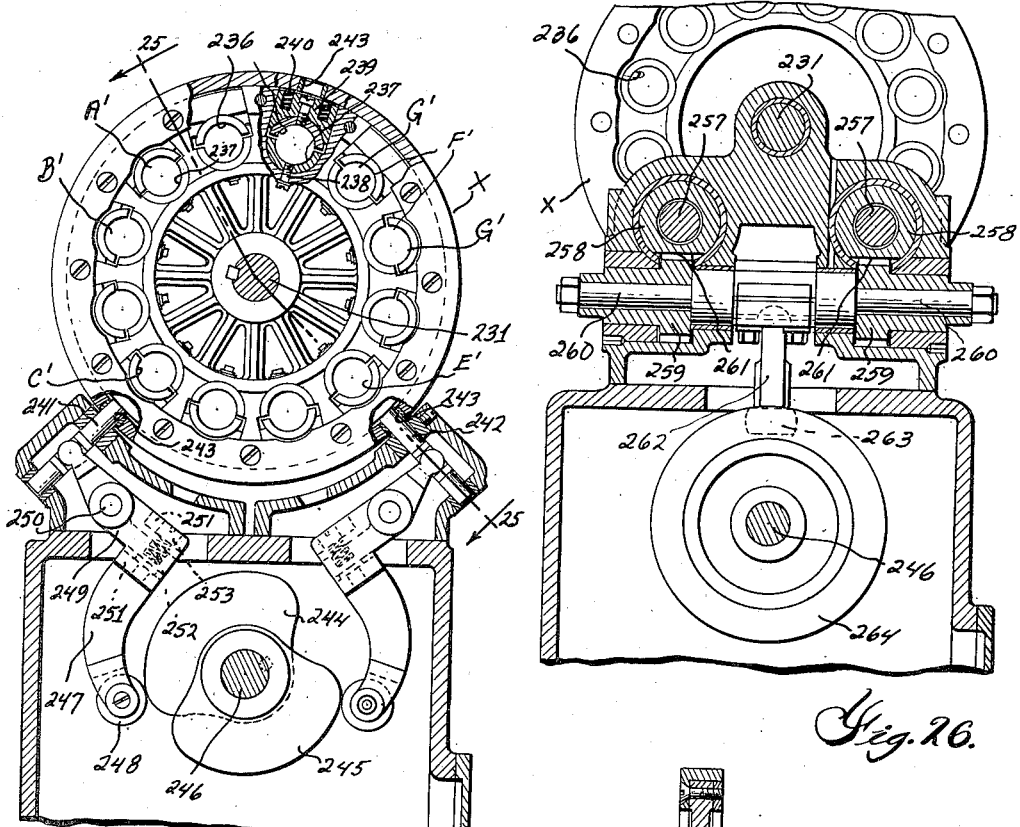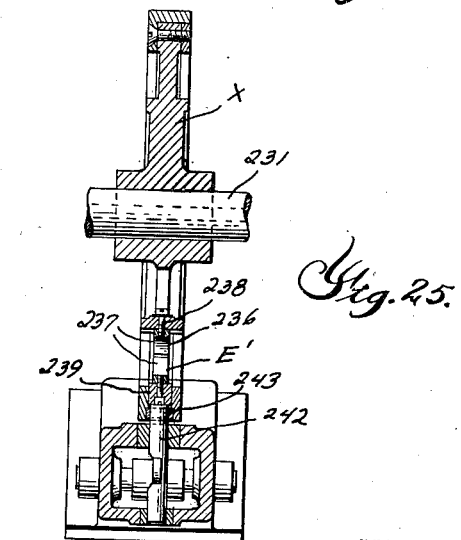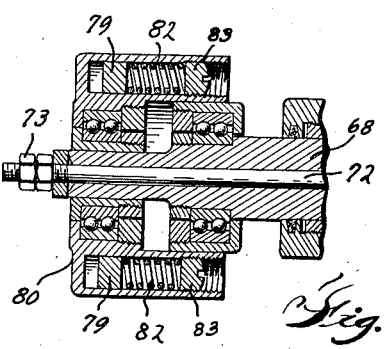

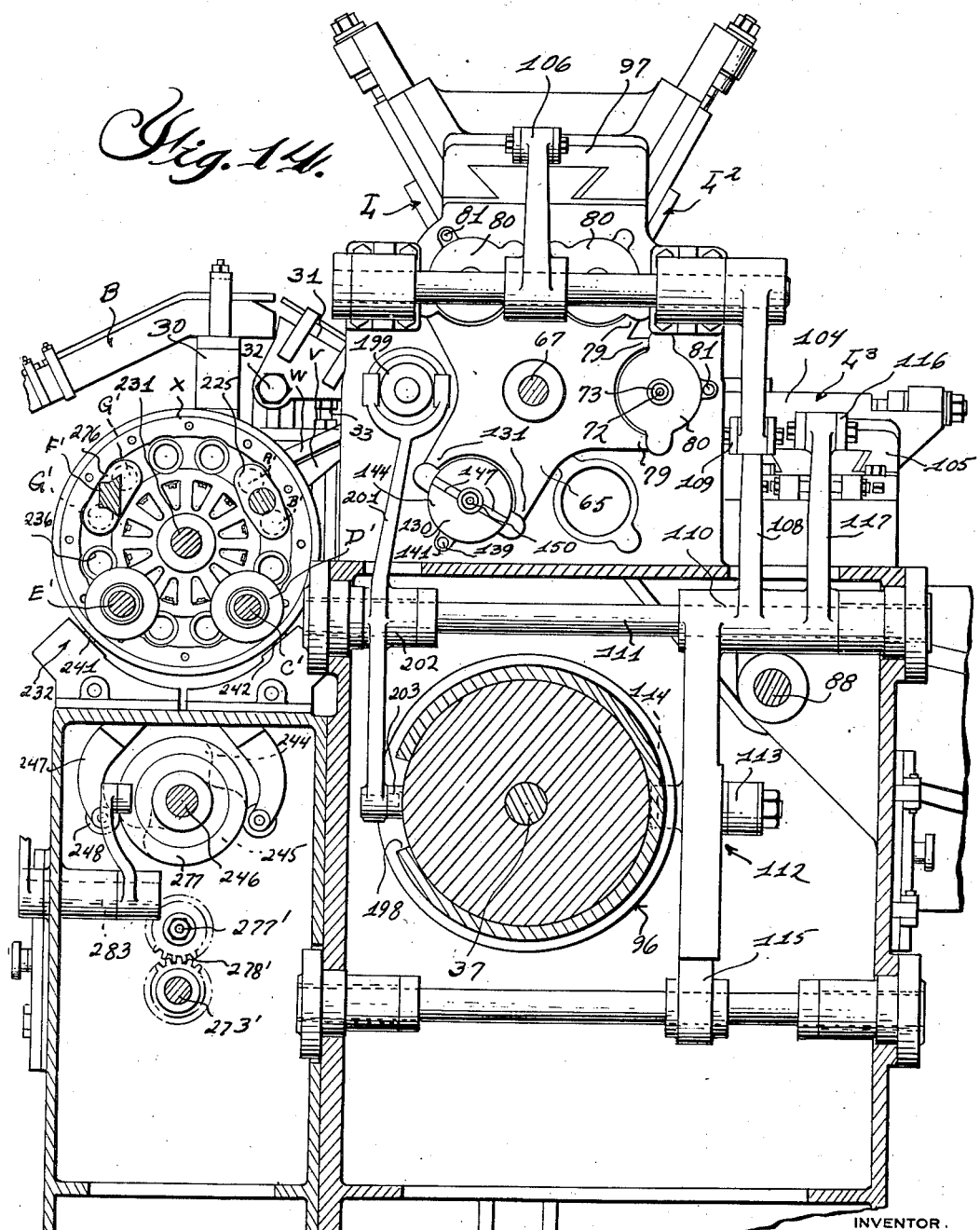

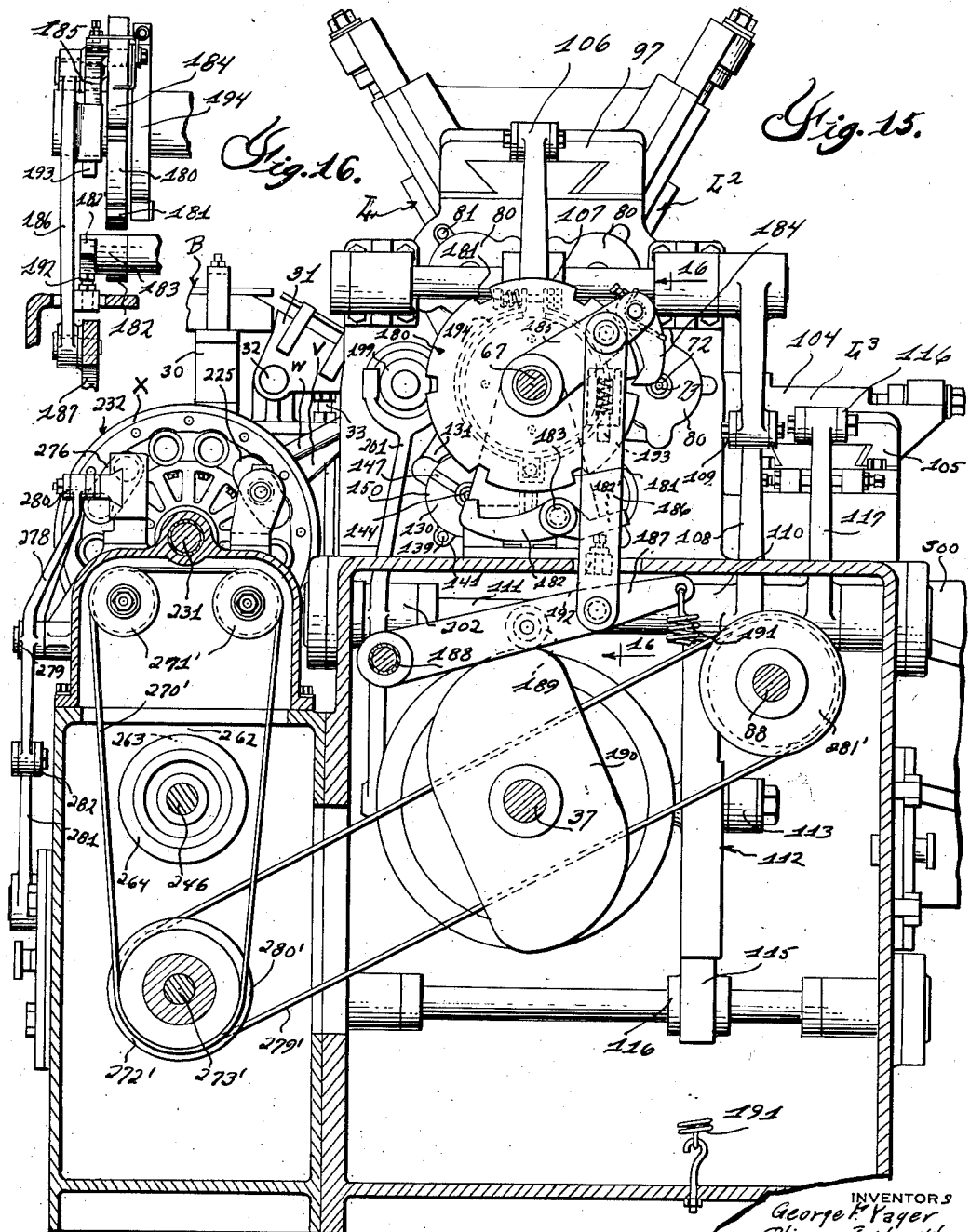

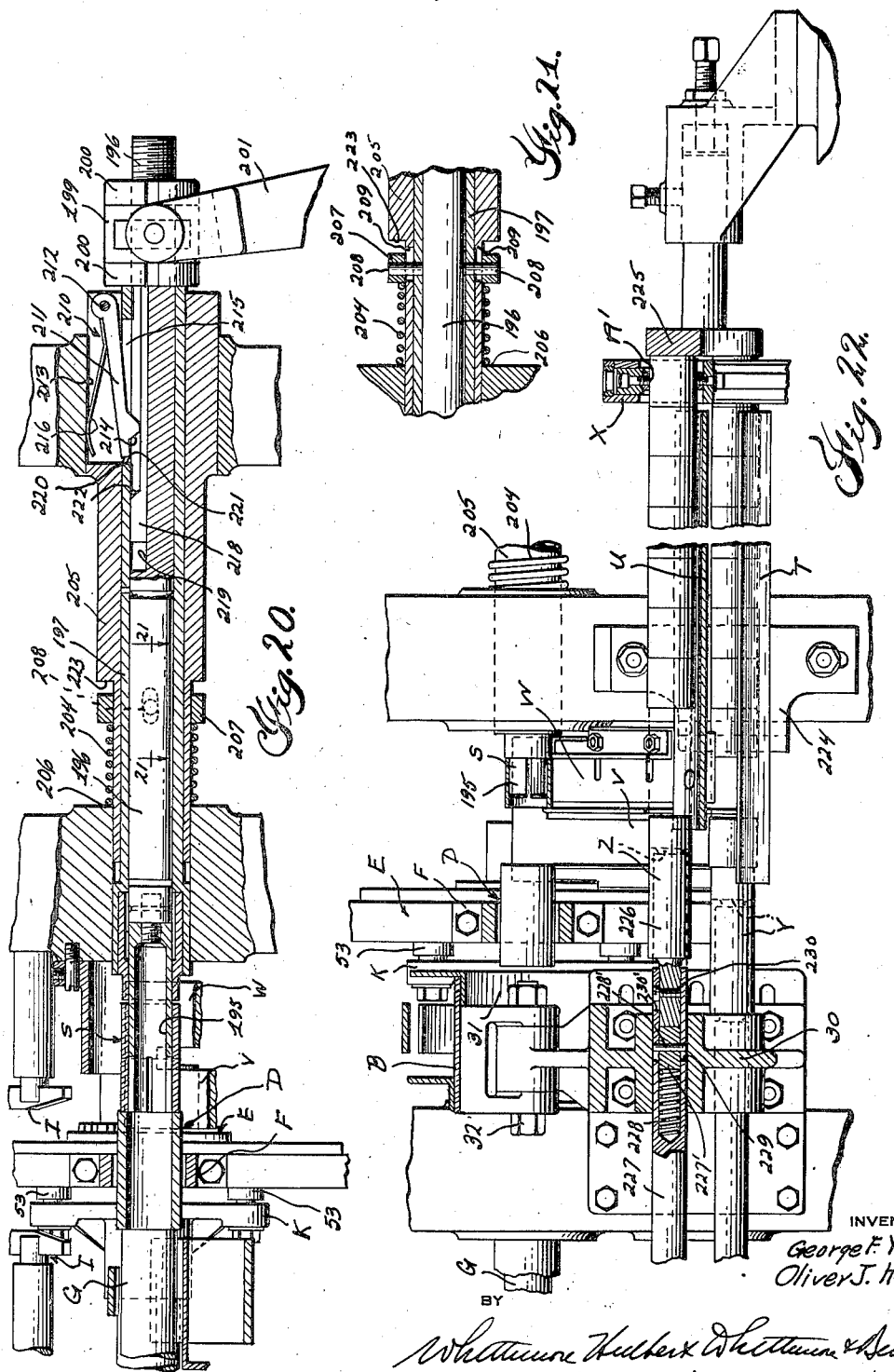

May 11, 1937.　　G. F. YAGER ET AL　　2,080,157
TURNING AND FACING MACHINE
Filed Dec. 12, 1933　　15 Sheets-Sheet 15

INVENTORS
George F. Yager
Oliver J. Heath
BY
ATTORNEYS

Patented May 11, 1937

2,080,157

UNITED STATES PATENT OFFICE 2,080,157

TURNING AND FACING MACHINE

George F. Yager and Oliver J. Heath, Toledo, Ohio, assignors to The Bunting Brass and Bronze Company, Toledo, Ohio, a corporation of Ohio Application December 12, 1933, Serial No. 702,042

73 Claims. (Cl. 29—38)

This invention relates generally to metal working machines and refers more particularly to machines for finishing bushings or like members.

One of the principal objects of this invention is to provide a machine thoroughly automatic in operation and having means for performing a plurality of operations on a corresponding number of bushings simultaneously so as to materially increase the rate of production of bushings as well as appreciably reduce the cost of manufacture thereof.

Another object of this invention which contributes materially in expediting production resides in the provision of a machine capable of performing certain operations on a bushing blank having a length sufficient to form a plurality of bushings and having means for severing the bushing blanks into a plurality of bushings in timed relation to the foregoing operations.

Another feature of this invention resides in the provision of means for severing the bushing blanks and simultaneously facing opposite ends of the bushings thus formed to impart a predetermined length thereto. This feature in combination with the one set forth in the previous paragraph provides a machine capable of not only turning bushing blanks of sufficient length to form a plurality of bushings to the desired outside diameter but also capable of subsequently severing the blanks thus machined and simultaneously facing opposite ends of the resulting bushings.

Another object of this invention resides in the provision of a turret having clamping means for the bushing blanks in association therewith and operable to periodically advance the blanks in registration with the several stations required to perform the foregoing operations.

Another advantageous feature of this invention resides in the novel means employed for releasing the clamps from the bushings and the means for revolving the bushings in timed relation to the operation of the releasing means.

A further feature of the present invention resides in the provision of means for unloading the bushings from the aforesaid turret upon completion of the several operations on the bushings and for transferring the bushings thus unloaded to a second turret operable to successively register the bushings with additional work performing stations.

A still further object of this invention resides in the provision of means for actuating the second turret in timed relation to the turret aforesaid and also in associating means with the second turret for chamfering the inner as well as the outer edges of opposite ends of the bushings carried by this turret and for positively securing the bushings in registration with the chamfering mechanism to the turret.

In addition to the foregoing, the present invention contemplates a machine wherein the several operations on the bushings are continuous from the loading station for the first mentioned turret to the unloading station of the second mentioned turret and wherein all of the operations are automatically effected in timed relation to each other. The novel construction for realizing the foregoing advantages will be made more apparent as this description proceeds, and it should be understood that the invention contemplates numerous other features which will also be more clearly set forth in the following description, especially when considered in connection with the accompanying drawings, wherein:

Figure 3 is an elevation of the right-hand end of the machine;

Figure 4 is a similar view of the left-hand end of the machine;

Figure 7 is a side elevation of the turning machine with certain parts broken away for the sake of clearness;

Figure 8 is a sectional view taken substantially on the line 8—8 of Figure 7;

Figure 10 is also a sectional view taken substantially on the line 10—10 of Figure 9;

Figure 11 is a sectional view taken substantially on the line 11—11 of Figure 10;

Figure 12 is a sectional view taken substantially on the line 12—12 of Figure 10;

Figure 13 is a sectional view taken substantially on the line 13—13 of Figure 10 extended to show a portion of the chamfering machine;

Figure 14 is a sectional view taken substantially on the line 14—14 of Figure 7 extended to show the chamfering machine;

Figure 15 is a sectional view taken on the line 15—15 of Figure 7;

Figure 16 is a sectional view taken on the line 16—16 of Figure 15;

Figure 17 is a sectional view taken on the line 17—17 of Figure 9;

Figure 18 is a sectional view taken on the line 18—18 of Figure 17;

Figure 20 is an enlarged section of the stripper shown in Figure 7;

Figure 21 is a fragmentary sectional view taken substantially on the line 21—21 of Figure 20;

Figure 22 is a sectional view taken substantially on the line 22—22 of Figure 9;

Figure 24 is a sectional view taken substantially on the line 24—24 of Figure 23;

Figure 25 is a sectional view taken on the line 25—25 of Figure 24;

Figure 26 is a sectional view taken on the line 26—26 of Figure 23.

Figure 1:
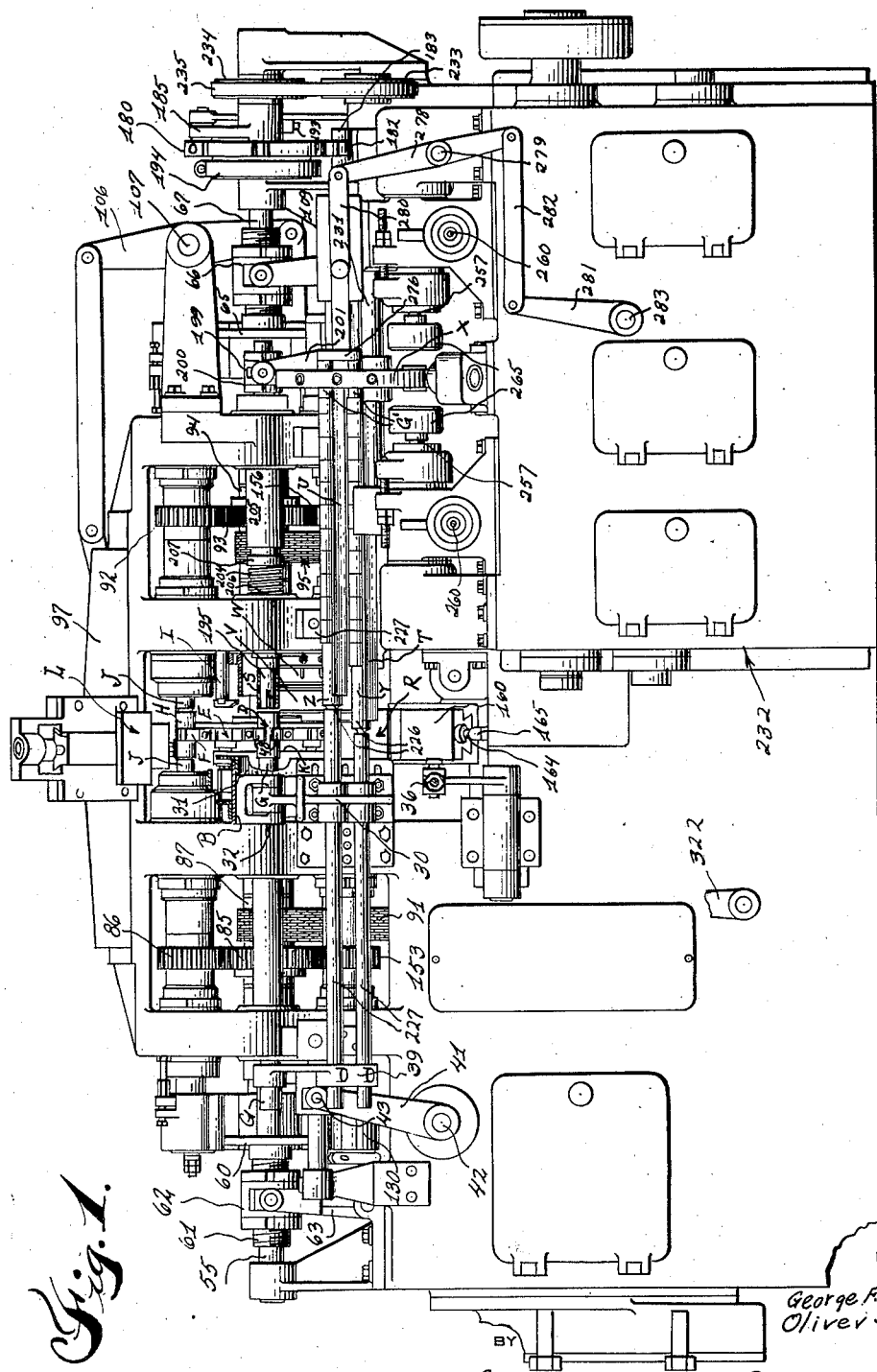
Figure 1 is a side elevation of a machine constructed in accordance with this invention.

The machine selected herein for the purpose of illustration is so designed as to permit forming a single bushing from a suitable blank or a plurality of bushings from a blank having a length at least equal to the combined length of two bushings. In either case, the several working parts of the machine may be readily adjusted in order to accommodate bushing blanks of different dimensions and form bushings of various sizes therefrom.

The particular setting of the machine shown herein is for the purpose of forming at least two bushings from a single blank, and, accordingly, particular stress will be placed upon this feature in the following description. In general, bushing blanks having a length sufficient to form at least two bushings are promiscuously deposited in a hopper A, and suitable mechanism is associated with the hopper for successively feeding the bushings in the hopper out of the discharge opening in the hopper. The feeding mechanism referred to above forms the subject matter of the George F. Yager and Oliver J. Heath copending application, Serial No. 567,106, filed October 5, 1931, and is not shown herein. The bushing blanks discharged from the hopper are positioned in registration with the receiving end of a suitable chute B and are positively moved along the chute B through the medium of a cam-actuated plunger C clearly shown in Figure 5 of the drawings. The discharge end of the chute B registers with a loading station D predeterminedly located with reference to a work-holding turret E having a plurality of clamps F secured thereto in circumferential spaced relationship and operated by a step-by-step movement to successively register the clamps F with the loading station D.

The plunger C is actuated in timed relation to the intermittent operation of the turret E so that a bushing blank is positioned in registration with the loading station D as the clamps F on the turret are successively moved into registration with the loading station. Located at the loading station D is a reciprocable plunger G operated in timed relation to movement of the turret to position a clamp F in registration with the loading station, to transfer a bushing blank from the discharge end of the chute between the jaws of the clamp which are automatically operated to grip the bushing blank in a manner to be more fully hereinafter described.

The loading operation is accomplished during the interval of rest of the turret, and as soon as the bushing blank has been transferred into the clamp F opposite the loading station, the turret is advanced to locate the bushing blank in registration with the next adjacent station designated herein by the reference character H. During movement of the turret E to advance the bushing blank to the station H, the blank is automatically located with reference to the clamp by suitable positioning mechanism I shown in Figure 11 as having cam portions for engaging opposite ends of the blank. When the turret E is again brought to rest, the bushing blank is in registration with the station H, and a pair of arbors J shown in Figure 10 as located at opposite ends of the bushing blank, are automatically moved toward each other to non-rotatably clamp the bushing blank thereto. As the bushing blank is clamped between the arbors J at station H, the clamp F securing the bushing to the turret, is automatically disengaged from the bushing blank by means of a releasing plate K permitting the arbors to rotate the bushing blank at a relatively high speed. In timed relation to the rotation of the bushing blank by the arbors, a cutting tool assembly L is moved axially of the bushing to take one cut from the exterior surface of the latter. As soon as the cutting tool completes its operation, the plate K is withdrawn from the clamps permitting the latter to again grip the bushing, and the arbors J are withdrawn from the latter in timed relation to the operation of the plate K.

The turret E then continues its movement to advance the bushing blank from the station H to the station M whereupon the operation at station H is repeated to take still another cut from the exterior surface of the bushing. It being apparent from Figure 11 that during advancement of the bushing from the station H to the station M by the turret, the blank is again accurately located by a second set of positioning elements $I_2$ to insure proper engagement of the second set of arbors J with the ends of the bushing blanks.

Upon completion of the operation of the second cutting tool $L_2$ at the station M, the turret E is again moved to advance the bushing blank from the station M to the station N where the operations at stations H and M are again repeated to effect the finishing cut on the exterior surface of the bushing blank by a third tool $L_3$ similar in construction to the tools previously referred to. A third set of positioning elements $I_3$ is located between the stations M and N so as to insure accurately locating the bushing blank prior to its introduction to the station N, and this third set of elements may be identical to the elements set forth above.

The fifth station O of the machine is idle in that no work whatsoever is performed on the bushing in registration with this station. As the turret E continues its advancement of the bushing blank, the latter is again properly located in its clamp by a fourth set of positioning elements $I_4$, and the bushing blank is registered with the sixth station of the machine designated herein by the reference character P. In timed relation to disengaging the clamp from the bushing blank at the station P by the plate K, a pair of arbors Q shown in Figure 17 are moved toward each other into clamping engagement with opposite ends of the bushing for again rotating the latter at a relatively high rate of speed. As soon as the bushing blank is rotated by the arbors Q, a tool assembly R is moved into engagement with the blank for finishing the opposite ends of the blank and for severing the latter into two bushings. Upon completion of the operation of the tool assembly R, the arbors Q are withdrawn from engagement with the bushing, and the clamp F on the turret is again actuated by the plate K to grip the two bushings. At this point, attention is called to the fact that in the event the bushing blank is of sufficient length to form but one bushing, the tool R is replaced by another tool of the type shown in Figure 19 designed to merely finish opposite ends of the blank.

Upon completion of the operation of the plate K to provide for reengaging the clamp F with the bushings in the manner stated above, the turret E is moved to register the bushings with the unloading station D whereupon operation of the plunger G to transfer a bushing blank between the clamps F forces the machined bushings out of the clamp onto a stripper assembly S.

Before defining the path of travel of the bushing from the stripper assembly S, attention is called to the fact that the foregoing description referred to the travel of only one bushing blank through the turning machine, and it is to be understood that when the turret is loaded, the stations D, H, M, N and P operate simultaneously to perform their respective functions upon the particular blanks in registration therewith. In other words, as the finished bushings are unloaded and a bushing blank is loaded at the station D, the stations H, M, N and P are operating simultaneously upon the bushing blanks in registration therewith.

Figure 6:
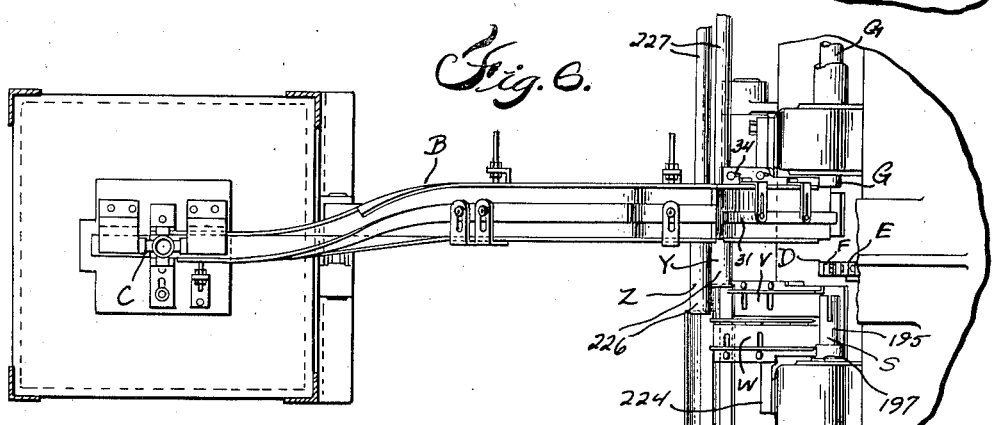
Figure 6 is a fragmentary top plan view of the construction illustrated in Figure 5 with certain parts broken away.

As previously stated, the two machined bushings ejected from the clamp on the turret E registering with the loading station are transferred by the plunger G upon the stripping device S, and the latter operates in timed relation to the actuation of the plunger G to strip the bushings from engagement therewith. The bushings thus stripped are conveyed by gravity to a pair of guides T and U through the medium of chutes V and W shown in Figures 6 and 22 of the drawings. As will be observed from the above figures, the guides extend in a direction transverse to the direction of movement of the bushings along the chutes, and the arrangement is such that the first bushing to be stripped is conveyed by the chute V to the guide T, and the second bushing to be stripped is conveyed by the chute W to the guide U. The bushings deposited upon the guides are advanced along the latter to the chamfering machine or, more specifically, to a second work-holding turret X by means of a pair of plungers Y and Z respectively registrable with the guides T and U. The aforesaid plungers are operated in timed relation to the stripping mechanism in such a manner that as soon as the bushings are deposited upon their respective guides, the plungers engage the bushings and advance the same along the guides toward the work-holding clamps A' and B' on the turret X in a manner to be more fully hereinafter set forth.

Figure 23:
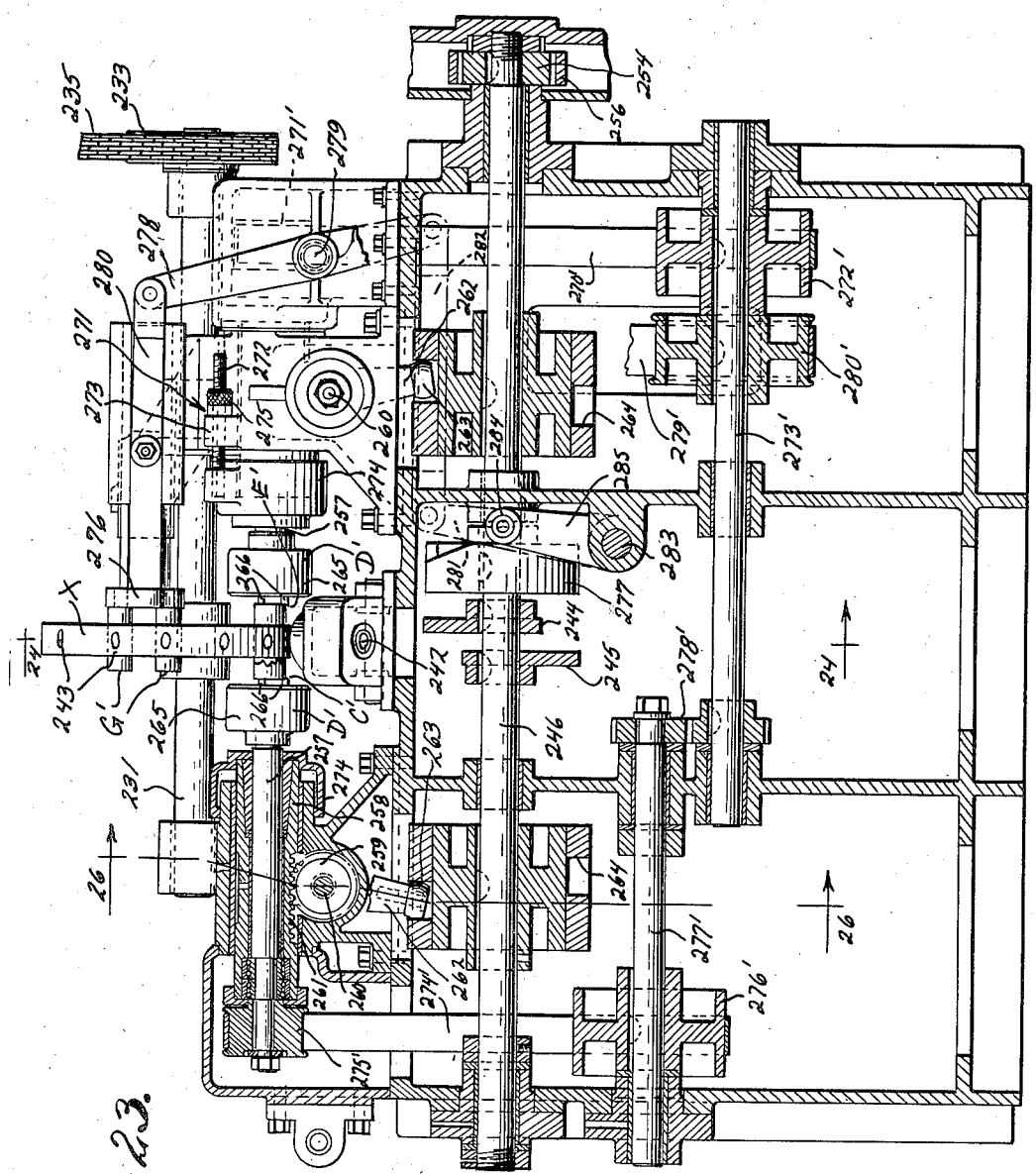
Figure 23 is a side elevation of the chamfering unit with certain parts broken away for the sake of clearness.

In the present instance, the turret X is intermittently driven by the turret E so as to have the same degree of angular travel as the latter turret. The bushings are transferred into the loading clamps A' and B' during the interval of rest of both turrets, and upon movement of the turret E to advance the bushings carried thereby to their next operative positions, the turret X is advanced to move the bushing in the clamp B' in registration with the first chamfering station C'. As soon as the turret X is brought to rest with the bushing in the clamp B' in registration with the chamfering station C', the chamfering tool carriers D' shown in Figure 23 are moved in directions toward each other to chamfer both the inner and outer surfaces at opposite ends of the bushing. During the chamfering operation, another pair of bushings is transferred into the next adjacent set of clamps, and upon completion of the chamfering operation, the turret X is again moved to advance the bushing in the first clamp of the last named pair into registration with the chamfering station C' and to position the first named pair of bushings opposite an idle station. Upon completion of the chamfering operation on the first bushing of the second pair at station C', and upon completion of the loading operation of the empty clamps registering with the loading stations, the turret is again advanced to register the bushing in the clamp A' with a second chamfering station E'. This latter chamfering station comprises apparatus identical to the apparatus C' and functions simultaneously to chamfer the bushings in the second clamp of each pair. In other words, the arrangement is such that at the station C', one bushing of each pair is chamfered and at the station E', the second bushing is chamfered. During the next operation of the turret X, the pair of finished bushings assume positions opposite the unloading station F' comprising a pair of plungers G' shown in Figure 23 as operating in timed relation to the actuation of the turret to eject the finished bushings from the chamfering machine.

Figure 5:
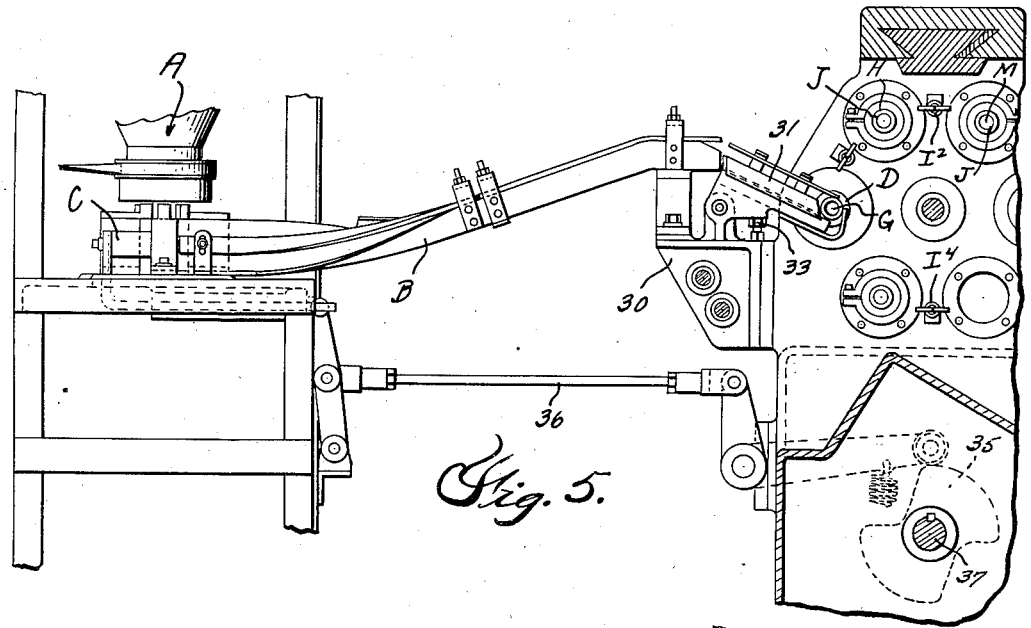
Figure 5 is a sectional view taken substantially on the line 5—5 of Figure 2 and showing the work feeding means.

Referring now more in detail to the particular construction of machine illustrated herein for effecting the functions previously set forth, it will be noted from Figure 5 that the axes of the bushing blanks in the discharge end of the chute B are at right angles to the axes thereof upon being discharged from the hopper. In other words, provision must be made for not only transferring the bushing blanks from the discharge end of the hopper to the loading station D, but the blanks must also be rotated 90° about their minor axes in order to properly position the same with reference to the clamps on the dial E. As pointed out above, the bushings are conveyed from the hopper to the loading station D by means of the chute B, and, in the present instance, the required rotation of the bushings about their minor axes is accomplished by forming a 90° spiral in the chute as shown perhaps more clearly in Figure 5. In the present instance, the chute is secured to a bracket 30 which in turn is fastened to the machine frame, and the discharge end portion 31 of the chute is pivotally connected as at 32 to the bracket for movement in a direction to properly locate the bushing blanks in registration with the loading station D. A suitable adjustable stop 33 of the type shown in Figure 5 is provided for holding the discharge end of the chute in any one of a number of positions relative to the loading station D. The discharge end of the chute, in addition to being angularly adjustable with reference to the pivot 32, is also adjustable in the direction of its length through the medium of the bolt and slot arrangement 34 to vary the position of the stop at the end of the discharge chute relative to the loading station D. Both of these adjustments are for the purpose of properly positioning the end bushing in the chute relative to the plunger G so that there will be no interference to movement of the end bushing into the clamps on the turret E when the latter register with the loading station D.

The bushings discharged from the hopper are positively fed along the chute B to the loading station D by means of the plunger C actuated by a cam 35 through the medium of linkage designated generally in Figure 5 by the reference character 36. The plunger C is normally maintained in a position by the cam to engage the side of the bushing opposite the receiving end of the chute B so that as the cam operates, the plunger C moves the bushing blank into the receiving end of the chute clear of the discharge opening in the hopper permitting unobstructed discharge of another bushing blank into registration with the chute upon withdrawal of the plunger C by the cam. The cam 35 is fixedly secured to the main cam shaft 37 upon which the cam 38 for reciprocating the combined loading and unloading plunger G is also secured. Consequently, both the cams are rotated at the same speed, and the development of both cams is so determined that as soon as the plunger G withdraws from its loading operation, the plunger C is actuated to move another bushing blank in registration with the plunger G.

Referring more in detail to the plunger G, it will be noted from Figure 7 that the plunger G is secured to a bracket 39 in axial alignment with the loading station D, and the bracket in turn is mounted upon a stationary shaft 40 for sliding movement in directions parallel to the axis of the plunger G. The bracket 39 is operated to reciprocate the plunger G by means of an arm 41 pivotally connected intermediate the ends thereof as at 42 to the frame of the machine and having the upper end thereof operatively connected to the bracket as at 43. The lower end of the arm is provided with a roller 44 for engaging the cam face 45 on the cam 38, and a suitable spring 46 is associated with the lever 41 for maintaining the roller in engagement with the cam face 45.

It has been previously stated that the plunger G functions to transfer a bushing blank from the discharge end of the chute B to a position in the clamp F on the turret E registering with the loading station D. In the present machine, six clamps F are spaced from each other equal distances circumferentially of the turret E, and since all of the clamps are identical in construction, only one will be described in detail. Referring to Figure 13 of the drawings, it will be noted that each of the clamps F comprises a pair of arms 47 pivotally connected at their inner ends to the turret E for swinging movement toward and away from each other. The outer ends of the arms project radially beyond the periphery of the turret E, and a clamping jaw 48 is secured to each of the arms with the gripping portions thereof facing each other so as to cooperate in clamping a bushing blank therebetween. The cooperating jaws 48 are normally urged into frictional engagement with a bushing blank by means of a spring 49 having the opposite ends respectively connected to the arms 47 in the manner clearly shown in Figure 13.

In the foregoing brief description of the function of the machine, reference was made to the operation of the plate K to disengage the cooperating clamping jaws from the bushing blanks, and in order to provide for obtaining this result, the arms 47 of each clamp are provided with inwardly extending lugs 50 having inclined faces 51 forming cams. The cam faces 51 are so designed as to cooperate with frusto-conical portions 52 of the pins 53 carried by the plate K to separate the jaws 48 against the action of the springs 49 to release the bushing blank between the jaws. In this connection, attention is called to the fact that it is only desirable to release the jaws from the bushing blank when the forming operation on the bushing requires the latter to be rotated, and, as a consequence, the releasing pins are located on the plate K in relation to stations H, M, N and P only. In other words, the provision of releasing means for the clamp adjacent the loading station is unnecessary, since the loading plunger G operates with sufficient force to displace the finished bushings from a position between the jaws and to substitute therefor an unfinished bushing blank.

The clamp releasing plate K operates during the interval of rest of the turret E to move in an axial direction toward the turret for spreading the cooperating clamping jaws opposite stations H, M, N and P. As shown in Figure 7, the plate K is fixed upon a shaft 55 slidably mounted in the machine frame in axial alignment with the axis of rotation of the turret E, and reciprocation of this shaft to effect the desired movement of the plate K is accomplished by means of a cam 56 also secured to the cam shaft 37. The cam 56 is so designed that during each interval of rest of the turret E, the plate K is moved in a direction toward the turret to release the clamps associated with the stations previously listed and to maintain these clamps released until the forming operations at the respective stations are completed, whereupon the cam effects movement of the plate K to permit reengagement of the clamping jaws with the bushing blanks therebetween.

By referring again to the brief description of the function of the machine previously set forth, it will be noted that reference was made to movement of the arbors at stations H, M, N and P toward each other into engagement with the ends of the bushing blanks opposite the same as the plate K releases the clamps from these bushings, and also that the arbors are moved in directions away from the ends of the bushing blanks upon movement of the plate K in a direction to permit reengagement of the clamps with the bushing blanks. Consequently, the arbors at the stations previously mentioned may be moved as a unit with the releasing plate K, and, in the present instance, the arbors on the same side of the turret E as the plate K are also actuated by the cam 56. This is accomplished by securing a spider 60 on the shaft 55 and attaching the several arbors to the spider in proper spaced relation to the stations on the turret E. As shown particularly in Figure 7, the spider 60 is provided with a hub 61 having a nut 62 axially adjustable thereon and connected through the medium of a lever 63 to the cam 56. Thus, it will be apparent that the cam 56 serves the dual purpose of actuating the plate K and the arbors on the same side of the turret E as the plate K. The cooperating arbors on the opposite side of the turret E are actuated by a cam 64 complementary to the cam 56 and secured to the cam shaft 37. These latter arbors are fixed in axial spaced relation to the arbors aforesaid upon a second spider 65 having a hub 66 slidably mounted upon the shaft 67 suitably journaled in the machine frame and having the turret E secured to the inner end thereof. The hub 66 of the spider 65 is operatively connected to the cam 64 for actuation by the latter in the same manner as the spider 60 is connected to the cam 56.

As previously stated, the arbors for rotating the bushing blanks at stations H, M and N are identical in construction, and, accordingly, only one of these arbors will be specifically described herein. The arbor construction employed at each of the three aforesaid stations is shown in Figure 10 and comprises a spindle 68 slidably and rotatably mounted in suitable bearings carried by the machine frame. Mounted within a tapered recess 69 formed in the inner end of the spindle 68 is a wedge-shaped member 70 having a pilot portion 71 projecting inwardly beyond the inner end of the arbor for engagement within the adjacent end of the bushing blank to be revolved. The direction of taper of the recess 69 and wedge member 70 is such as to permit interchanging the wedge member with corresponding members having different diametered pilot portions for engaging various sizes of bushings. The wedge member 70 is secured in the recess 69 by means of a tie rod 72 extending axially through the spindle with the inner end threadedly engaging the outer end of the wedge member and having the outer end secured to the corresponding end of the spindle through the medium of the adjusting nuts 73.

In order to non-rotatably secure the bushing blanks to the arbors or, in other words, provide for rotation of the blanks by the arbors, the portion of the wedge member projecting inwardly beyond the arbor is recessed as at 74, and a gripping element 75 is pivoted in the recess by means of a pin 76 extending at right angles to the axis of rotation of the arbor. Portions of the gripping member 75 extend laterally beyond the periphery of the pilot 71, and the inner edges of these portions are tapered as at 77 to provide diametrically opposed knife edges 78 fashioned to bite into the ends of the bushing upon movement of the arbors into engagement with the latter.

As hereinbefore pointed out, the arbors at the turning stations are moved axially to engage the bushing blanks by means of the spiders 60 and 65, and inasmuch as the particular operative connections between the spiders and arbors are identical, only one of the connections will be described in detail. The particular arbor specifically described in the preceding paragraph is moved axially to engage the adjacent end of the bushing in registration therewith by the spider 60, and the operative connection briefly referred to above consists in the provision of a pair of ears 79 on the spider engageable within a head 80 fixed to the outer end of the spindle 68 by means of the studs 81. The ears 79 extend into the head on diametrically opposite sides of the spindle through slots elongated in the direction of the axis of the head. As shown particularly in Figure 12, the ears 79 are yieldably urged into engagement with the rear wall of the head by means of suitable coil springs 82 having the outer ends engaging the inner sides of the ears and having the inner ends abutting adjustable stops 83 fixed in the head 80. The arrangement is such that inward movement of the spider effects a corresponding movement of the spindle toward the bushing through the medium of the springs 82 so as to compensate for variations in length of the bushing blanks to be engaged thereby, and outward movement of the arbors to disengage the bushing is effected positively by engagement of the ears with the outer walls of the heads 80.

In order to insure proper disengagement of the spindles from the bushings, a stripper 80' is associated with each of the spindles in the manner clearly shown in Figure 10 of the drawings. The stripper 80' is journaled within a ring 81' fixed in any suitable manner to the frame of the machine and is driven from the spindle 68 by means of a slot and pin connection designated generally by the reference character 82'. This connection is such as to drive the stripper from the spindle, but at the same time permit relative axial movements of these two elements. As shown particularly in Figure 11, the stripper is provided with a tubular portion 83' fashioned to receive the pilot 71 and having diametrically opposed, axially extending slots 84' providing for the required sliding movement of the gripping members. The diameter of the tubular portion 83' approximates the diameter of the bushings so as to form an abutment for engaging the ends of the bushing to strip the latter off of the pilots 71 upon outward movement of the arbors. The strippers 80' are fixed against sliding movement relative to the arbors so that movement of the latter inwardly is effected relative to the strippers permitting the pilots 71 to move beyond the inner ends of the tubular portions 83' into the adjacent ends of the bushing the distance required to grip the bushing by the members 75. With this construction, it will be seen that should one end of the bushing adhere to one of the pilots 71 upon outward movement of the associated arbor, movement of the bushing outwardly as a unit with the arbor will be arrested by the tubular portion 83' so that continued outward movement of this arbor strips the bushing from the pilot 71.

The spindles 68 carried by the spider 60 are rotated by a central gear 85 arranged in constant mesh with a suitable gear 86 splined upon each of the spindles 68 in such a manner as to provide the necessary axial travel of the spindles relative to the gears 86. The central gear 85 is keyed to a sleeve 87 journaled on the shaft 55 and driven from the drive shaft 88 of the machine. The driving connection between the sleeve 87 and shaft 88 comprises a sprocket 89 fixed to the sleeve 87 and a sprocket 90 fixed to the drive shaft 88 and connected to the sprocket 89 through the medium of a chain 91. The spindles of the corresponding arbors on the opposite side of the turret E or, in other words, the spindles 68 carried by the spider 65 are rotated at the same speed as the spindles set forth above by identical mechanism. In detail, each of the spindles carried by the spider 65 has a gear 92 splined thereon for engaging a central gear 93 keyed to a sleeve 94 journaled on the shaft 67 and driven from the drive shaft 88 through the medium of the sprocket and chain assembly designated generally by the reference character 95. It should, of course, be understood that the arbors carried by the spider 65 at stations H, M and N are identical in construction to the corresponding arbors carried by the spider 60, one of which has been described in detail in the preceding description.

Figure 2:
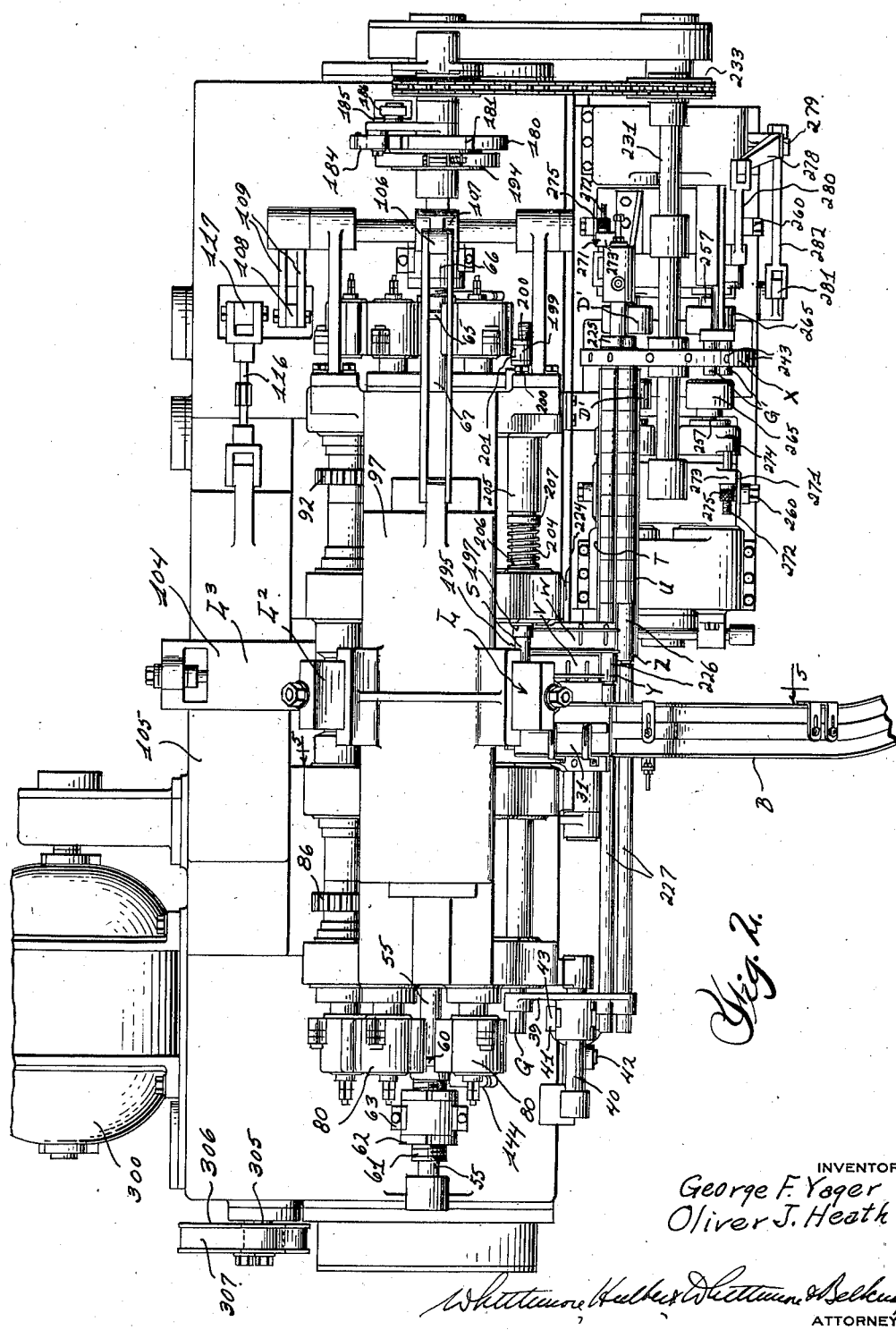
Figure 2 is a plan view of the machine illustrated in Figure 1.

Referring now more in detail to the operation of the turning tools L, L₂ and L₃ at the stations H, M and N, respectively, it will be noted from Figures 2, 7 and 14 that each of these tools is operated simultaneously from a single cam 96. It will also be observed from Figure 9 that the turning tools L and L₂ are carried by a common slide 97 mounted for reciprocation on the frame of the machine in directions to slide the tools carried thereby axially of the bushing blanks across the external surfaces thereof. The cutting members 98 and 99 respectively for the tools L and L₂ are fixed upon suitable tool holders 100 which in turn are adjustably secured to opposite sides of the slide 97 for movement radially toward and away from the bushing blanks. The cutting member 101 of the turning tool L₃ is also fixed to a tool holder 104 adjustably mounted upon a slide 105 for radial movement toward and away from the bushing blank in registration therewith. The slide 105, like the slide 97, is reciprocably mounted upon the frame of the machine for moving the cutting member 101 axially of the bushing blank in registration therewith to finish the exterior surface of the same.

As indicated above, the slides 97 and 105 are actuated by a common cam 96 which is so developed as to reciprocate the tool slides as soon as the arbors function to rotate the bushings. The cam 96 is fixed to the cam shaft 37 and is connected to the slide 97 for actuating the same by a system of levers. In detail, one end of the slide 97 is connected to the upper end of a rock arm 106 pivotally connected intermediate the ends thereof as at 107 to a fixed part of the frame and having the lower end pivotally connected to the upper end of a second rock arm 108 through the medium of a link 109. The rock arm 108 is provided with a hub 110 intermediate the ends thereof journaled upon a shaft 111 fixed to the machine frame, and the lower end of the rock arm 108 is operatively connected to the cam 96 by means of an adjustable connection 112 shown particularly in Figure 7. The connection 112 is adjustable to vary the stroke as well as the location of the cutting members 98 and 99 relative to the bushing blanks. In detail, this connection comprises a link 113 constructed to permit varying the length of the same and having one end anchored to a suitable block mounted upon the lower end portion of the rock arm 108 for adjustment in the direction of length of this arm. The opposite end of the link 113 is connected to a second block which in turn carries the cam follower 114 for the cam 96 and is mounted in a rock arm 115 for sliding movement in the general direction of sliding movement of the opposite end of the link 113. The arm 115 is pivoted to a fixed part of the frame as at 116 for swinging movement about an axis parallel to the axis of rocking movement of the arm 108. Thus, it will be apparent that varying the elevation of the connections between opposite ends of the link 113 and rock arms 108 and 115, correspondingly varies the stroke of the tool slide 97. It will also be seen that adjustment of the length of the link 113 to vary the distances between the connections of this link with the aforesaid rock arms will change the position of the cutting members carried by the slide 97 relative to the bushings.

In order to reciprocate the tool slide 105 as a unit with the slide 97 from the same cam 96, we provide means for connecting the slide 105 to the hub 110 of the rock arm 108. This means comprises a link 116 having one end pivotally connected to the slide 105 and having the opposite end pivotally connected to the upper end of a lever 117 having the lower end formed integral with the hub 110 of the rock arm 108. Thus, it will be apparent that rocking of the arm 108 by the cam 96 to actuate the tool slide 97 effects a corresponding rocking movement of the lever 117 to actuate the finishing tool slide 105. It will also be noted that inasmuch as the slide 105 is actuated from the rock arm 108, adjustment of the latter by means of the connection 112 previously described will effect a corresponding adjustment of the slide 105.

As indicated in the brief description of the function of the machine previously set forth, the station P operates to sever a bushing blank in registration therewith to form two bushings and to simultaneously machine opposite ends of the resulting bushings to form the latter to a predetermined length. It has also been pointed out above that the severing tool at this station is interchangeable for a tool of the type shown in Figure 19 operable to machine opposite ends of a bushing blank without severing the latter in two parts. The arbors Q at the station P for revolving the bushing blanks in registration with said station differ from the arbors previously described and are shown particularly in Figure 17 of the drawings. In detail, the arbors Q are provided with spindles 118 mounted in bearings 119 on the machine frame for sliding movement toward each other and having members 120 secured to the inner edges thereof fashioned to grip opposite ends of the bushing upon sliding movement of the arbors toward each other. The members 120 are threadedly mounted within the inner ends of the spindles 118 and are provided with tubular portions 121 extending beyond the inner ends of the spindles for engagement within opposite ends of the bushing blank therebetween. The extreme inner ends of the tubular portions 121 of the members 120 are slotted in the direction of the axes of the spindles to form fingers 122 capable of being expanded within the bushing blank to secure the latter to the spindles. In the present instance, the fingers 122 are expanded by means of draw rods 123 extending axially through the spindles and composed of two sections 124 and 125. The inner ends of the sections 125 are formed with enlarged frusto-conical head portions 126 for engaging correspondingly tapered surfaces of the fingers 122 to expand the latter into engagement with a bushing blank when the members and head portions are relatively axially moved in opposite directions. The sections 125 of the draw rods are moved axially outwardly with respect to the fingers 122 on the member 120 by means of the sections 124, and the inner ends of the latter are connected to the adjacent outer ends of the sections 125 through the medium of couplings 127 adjustable for varying the effective lengths of the draw rods and thereby compensate for bushings of different lengths. Inasmuch as the members 120 are threadedly mounted within the inner ends of the spindles, it necessarily follows that these members are also capable of adjustment axially of the spindles in order to maintain the same relationship between the fingers 122 thereon and enlarged head portions 126 of the draw rods. The adjustable couplings briefly referred to above are threadedly mounted at the outer ends upon suitable sleeves 128 which in turn are threaded on the outer ends of the sections 124 of the draw rods. The interior surfaces of the couplings at the inner ends thereof are tapered toward the axis of the spindle for engaging correspondingly tapered nuts 129 which in turn are threadedly mounted upon the outer ends of the sections 125 in the manner clearly shown in Figure 17. By reason of this latter arrangement, the nuts 129 are wedged into the inner ends of the couplings upon drawing the sections 124 rearwardly so as to effectively impart a corresponding movement to the sections 125 without the danger of stripping the threads.

The arbors Q are reciprocated by the spiders employed for reciprocating the arbors previously referred to in much the same manner as the latter arbors in that suitable heads 130 are associated with the outer ends of the spindles 118 of the arbors Q for receiving another set of ears 131 on the spiders 60 and 65. The ears 131 are connected to the head 130 for sliding movement axially of the spindles, and movement of the ears inwardly relative to the heads is restricted by means of suitable coil springs 132. The outer ends of the coil springs abut the ears 131 on the spiders, while the inner ends of the springs abut stops 133 adjustably carried by the head in the manner clearly shown in Figure 18, so that movement of the spiders toward each other effects a corresponding movement of the heads 130 through the springs 132. As shown in Figures 17 and 18, the heads 130 are not directly secured to the spindles 118, but, on the other hand, are connected to collars 134 journaled upon the outer end portions of the spindles for engagement with adjustable stops 138 carried by a fixed part of the machine frame. The connections between the heads 130 and collars 134 are of the lost motion type in that a predetermined inward travel of the heads 130 relative to the collars 134 is permitted after the latter engage the stops 138. In detail, this connection comprises suitable pins 139 fixed to the collar and having shank portions 140 extending outwardly therefrom for slidably receiving ears 141 on the heads 130. As will be evident from Figure 17, the pins 139 are provided with enlarged portions 142 for holding the heads 130 in assembled relation with the collars, and suitable springs 143 are interposed between the latter elements for normally maintaining the heads 130 in spaced relation to the collars and for effecting inward movement of both the latter elements as a unit until the collars 134 engage the stops 138.

With the construction as thus far described, it will be apparent that inward movement of the heads 130 by the spiders effects a corresponding inward movement of the spindles 118 through the medium of the springs 143 and collars 134. The extent of the aforesaid inward movement of the spindles is sufficient to engage the fingers 122 on the members 121 within opposite ends of the bushing blank in registration with the arbors. As soon as the collars 134 engage the stops 138, the heads 130 continue their inward movement relative to the collars 134 and, accordingly, the spindles 118, and during this relative movement, the draw rods 123 are actuated to expand the fingers 122 within the bushing to grip the same. The mechanism for moving the draw rods in directions to expand the fingers 122 upon movement of the heads 130 relative to the spindles comprises a member 144 carried by each of the heads 130 and having a hub 145 journaled in the heads 130 and receiving the outer ends of the spindles. Each of the members 144 is formed with a slot 146 therein for receiving a pair of dogs 147 arranged upon diametrically opposite sides of the outer end of the draw rod and extending radially from the rods with the outer ends pivoted to the plates as at 148. The free ends of the dogs are interposed between the outer ends of the spindles 118 and suitable abutments 149 adjustably secured to the outer ends of the draw rods 123 by means of the nuts 150. Inasmuch as the pivotal supports for the dogs are carried by the heads 130, and in view of the fact that the free ends of the dogs engage the outer ends of the spindles in abutting relation to the abutments 149 on the draw rods, it will be noted that inward movement of the heads 130 relative to the spindles 118 in the manner outlined above will draw the bars 123 outwardly, and in so doing expand the fingers 122 in the bushing to clamp the latter in fixed relationship to the arbors.

Movement of the spiders outwardly or, in other words, in directions away from each other effects a movement of the heads 130 and pivot pins 148 for the dogs in a corresponding direction relative to the spindles 118. Displacement of the pivots 148 in the aforesaid direction releases the tension on the draw rods 123 and permits the fingers 122 to collapse to their normal positions wherein the bushing is released from clamping engagement therewith. The heads 130 and associated parts thereof move outwardly relative to the spindles 118 until the enlarged portions 142 of the pins 139 carried by the collars 134 are engaged by the heads whereupon continued outward movement withdraws the fingers on the spindles from the opposite ends of the bushing.

In order to insure proper releasing of the bushings from the arbors Q during withdrawal of the spindles 118, suitable strippers 151 are associated with the inner ends of the arbors. The strippers 151 are secured to a fixed part of the frame in the manner clearly shown in Figure 17 and are provided with tubular inner end portions 152 fashioned to permit extension of the fingers therethrough upon inward movement of the spindles. The length of the tubular portions 152 is predetermined so that the extreme inner ends of these portions assume positions adjacent opposite ends of the bushing and the diameter thereof approximates the diameter of the bushings. With this construction, it will be apparent that should one end portion of the bushing adhere to one of the spindles upon outward movement thereof, the aforesaid end will abut the end of the adjacent tubular portion 152, and inasmuch as the latter is fixed relative to the outwardly moving spindle, the bushing will be stripped from the latter.

Rotation of the arbor Q connected to the spider 60 is effected by a gear 153 splined upon the spindle 118 of the above arbor and adapted to mesh with the central gear 85 in the same manner as the gears 86 hereinbefore described. The cooperating arbor assembly actuated by the spider 65 is also provided with a gear 156 adapted to mesh with the central gear 93 hereinbefore referred to as operating the arbors opposite the stations H, M and N.

Figure 9:
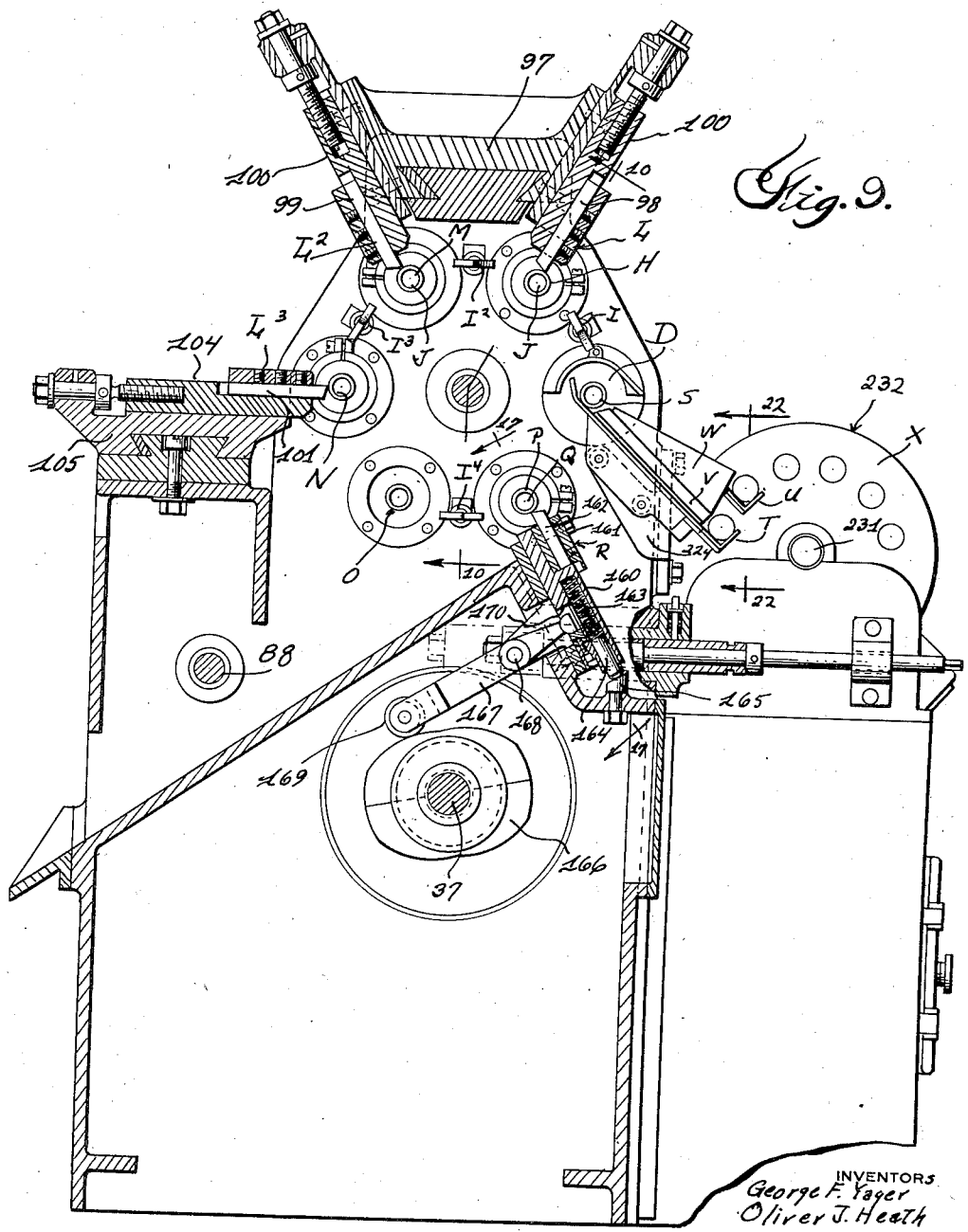
Figure 9 is a sectional view taken on the line 9—9 of Figure 7.

The means for revolving the bushings at the station P having been described above in detail, reference will now be made to the tool R for machining the bushings at the station P. As shown in Figures 9 and 17 the tool R functions during rotation of the bushing blank to sever the latter into two bushings and to simultaneously finish opposite ends of the bushings thus formed. The tool R comprises a holder 160 mounted for sliding movement radially with reference to the common axis of rotation of both the arbors Q at station P and having suitable clamping means 161 for securing the cutting element 162 thereto. In the present instance, the tool holder is normally urged in a direction to move the cutter 162 into engagement with the bushing blank by means of a spring 163 located within a counterbored recess in the outer end of the tool holder. The inner end of the spring abuts the corresponding end of the recess, while the outer end of the spring engages a plunger 164 slidably mounted in the counterbored recess and projecting beyond the outer end of the tool holder for engaging a stop 165 carried by a part of the machine frame. Thus, it will be seen that the tool is not positively moved during the cutting operation so that there will be no danger of the tool chattering during the finishing cut or of the parts becoming jammed in the event the tool should break. In the case of breakage, the spring would merely hold the broken tool against the bushing blank.

In order to positively return the tool after the completion of the cutting operation, I provide a cam 166 mounted on the main cam shaft 37 and operatively connected to the tool holder through the medium of a lever 167. The lever is pivotally connected as at 168 intermediate the ends thereof, and the lower end of the lever is provided with a cam follower or roller 169 held into contact with the cam by means of the spring 163. The upper end of the lever, on the other hand, engages within a slot 170 in the tool holder and this slot is elongated in a direction to provide the necessary clearance for actuation of the tool holder by the spring 163. The cam 166 is so designed as to permit operation of the cutting member 162 by the spring in timed relation to movement of the arbors Q into engagement with the bushing blanks.

Figure 19:
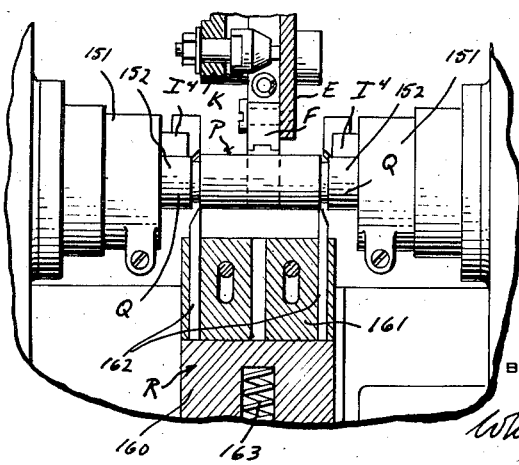
Figure 19 is a view similar to a portion of Figure 17 showing the type of tool employed when it is desired to omit the severing operation and to merely finish opposite ends of the blank 17.

The cutting member 162 previously described is employed only when it is desired to sever the bushing blank into two bushings, and this cutting member may be readily interchanged with a tool of the type shown in Figure 19 in the event it is merely desired to finish opposite ends of the bushing without severing the same. The tool may be readily interchanged by merely removing the clamping means 161, since the feeding operation of one tool is absolutely the same as the other.

In the previous description, reference has been made to the likelihood of one end of a bushing blank adhering to one of the arbors during movement of the latter to withdraw the same from the bushing blank, and while means is associated with each of the arbors to strip the bushing therefrom, nevertheless, the bushing blanks frequently become displaced slightly from their desired positions relative to the clamps on the turret E. Consequently, the positioning devices I, I₂, I₃ and I₄ are so located as to reposition the bushings during their travel from one station to the other. Each of the four positioning devices is identical in construction and as illustrated in Figures 10 and 11 comprises aligned plungers 171 arranged upon opposite sides of the path of travel of the bushing blanks by the turret E. The plungers are axially adjustably mounted within suitable brackets 172 fixed relative to the turret E and are each provided with cam members 173 spaced from each other a distance approximating the length of the bushing blanks. Inasmuch as the bushing blanks are yieldably clamped upon the turret E, it will be apparent that in the event these blanks become misplaced, the cam members will engage one end of the blanks and force the same axially of the clamps to their proper positions relative to the latter. With the above construction, any slight displacement of the bushing blanks effected as a result of the operation at any one of the stations is immaterial, since this blank is repositioned prior to entering the next adjacent station.

During one complete revolution of the turret E, a bushing blank is registered with six stations, and these stations are spaced equal distances from each other concentrically with respect to the axis of rotation of the turret E. Accordingly, each period of advancement of the turret E is throughout an arc of 60°, and the indexing mechanism for accomplishing this result is shown in Figures 15 and 16 and will now be described. As set forth in the preceding description, the turret E is fixed to the shaft 67, and mounted upon the same shaft is a spacing dial 180 having six slots 181 in the periphery thereof spaced 60° apart and successively engageable with the free end of a dog 182 having the opposite end portion rockably mounted at 183 on the machine frame. The arrangement is such that when the dial 180 is latched against rotation by engagement of the dog with any one of the slots 181, the clamps on the turret E will assume positions in registration with the six stations surrounding the turret E. The dog 182 is automatically released from the dial in timed relation to movement of the dial throughout its angular travel of 60° in a manner to be presently described, and the means for advancing the dial throughout the aforesaid degree of angular travel comprises a pawl 184 also successively engageable in the slots 181. In detail, the pawl 184 is pivotally connected to the outer end of a rock arm 185 having the inner end journaled upon the shaft 67 and connected intermediate the ends to the upper extremity of a link 186 having the lower end pivotally connected to an arm 187 which in turn is journaled as at 188 on the machine frame. Carried by the arm 187 intermediate the ends thereof is a cam follower or roller 189 for engaging a cam 190 driven by the cam shaft 37. The roller 189 is normally urged into frictional engagement with the cam surface by means of a spring 191 having the upper end fixed to the free end of the arm 187 and having the lower end anchored to the frame of the machine. Thus, it will be seen that the pawl 184 is operatively connected to the cam 190, and the development of the latter is such as to move the pawl downwardly or, in other words, advance the slot 181 on the dial with which the pawl engages 60° when the work performing devices at the several stations adjacent the turret have returned to their inoperative positions and the clamps on the turret reengaged with the bushing blanks by retraction of the clamp releasing plate K. When the turret E has been advanced 60° by the dial, the pawl 184 is moved upwardly by the cam 190 a corresponding distance to engage the swinging end of the pawl into the next adjacent slot, and during the interval of upward movement of the pawl, the several stations associated with the turret perform their respective operations upon the bushing blanks in registration therewith so that as soon as the pawl is reengaged with the dial, the latter may be advanced another 60°.

As indicated above, the dog 182 must be released from the dial prior to actuation of the same by the pawl 184, and this is accomplished automatically by locating an adjustable stop 192 on the link 186 in such a position that during the final portion of movement of the link 186 by the cam to engage the pawl 184 with the next adjacent slot in the dial, the stop 192 engages an extension 182' on the dog 182 and rocks the latter about the pivot 183 to disengage the same from the dial. Actual disengagement of the dog from the dial is effected as soon as the pawl 184 is moved into operative engagement with the dial so that the dog will not interfere with advancement of the dial by the pawl. In order to prevent accidental movement of the turret E by the dial after the latter has been advanced throughout 60° by the pawl, it is equally important to insure reengagement of the dog with the dial, and this is accomplished herein by locating a spring pressed plunger 193 on the link 186 in such a position that during the final movement of the dial by the pawl, the plunger engages the extension 182' on the dog and yieldably urges the free end of the dog into frictional engagement with the periphery of the dial so that upon completion of advancement of the dial by the pawl, the dog will automatically engage in the slot preceding the one within which the pawl engages, to latch the dial against further movement. Thus, it will be seen that the turret E is accurately indexed by the dial, and to positively prevent any possibility of the dial overrunning the angular extent of movement provided, a friction brake 194 is associated with the dial so as to resist advancement of the same by the pawl 184.

As the turret E is indexed to advance the bushings thereon in registration with the next succeeding stations, the bushings formed at the station P are transferred to the loading station D, and the plunger G operates in the manner previously set forth to eject the two bushings from the associated clamp by inserting a bushing blank between the cooperating jaws of the latter clamp. The two bushings ejected from the clamp in registration with the loading station by the plunger G are sleeved on the stripping device S slidably supported in the frame of the machine in axial alignment with the plunger G on the side of the turret E opposite the side upon which the plunger is mounted. As shown in Figure 20, the stripping device S comprises a tubular inner end portion 195 of sufficient dimension to receive the pair of bushings ejected from the station D and having the outer end fixedly secured to a draw rod 196 reciprocably mounted in a sleeve 197 which in turn is supported in the machine frame for axial sliding movement relative to the rod 196. The outer end of the rod 196 projects beyond the sleeve 197 and is operatively connected to a cam 198 fashioned to move the rod 196 toward the turret E at the same time the plunger G operates to unload the turret or, in other words, is moved toward the latter. The connection between the rod 196 and the cam 198 comprises a collar 199 slidably mounted on the outer end of the rod and fixed to the latter by means of the adjusting nuts 200 threaded upon the rod on opposite sides of the collar. The collar is pivotally connected to the upper end of a rock arm 201 which in turn is pivotally mounted intermediate the ends thereof on the shaft 111 as at 202 and having a cam follower 203 fixed to the lower end thereof for engaging the cam 198. The location of the collar 199 upon the outer end of the rod 196 is such that during the interval of final movement of the rod toward the turret E, the innermost adjusting nut 200 engages the outer end of the sleeve 197 and moves the latter as a unit with the rod against the action of the spring 204. The spring 204 surrounds the bushing 205 within which the sleeve 197 reciprocates, and the inner end of the spring engages a fixed abutment 206 formed by a part of the machine frame, while the outer end of the spring abuts a collar 207 slidably mounted on the bushing 205. Referring to Figure 21, the collar is connected to the sleeve 197 by means of suitable pins 208 extending laterally from opposite sides of the sleeve through elongated slots 209 in the bushing and having the extremities thereof engaging the collar. With the construction as thus far described, it will be apparent that movement of the sleeve 197 inwardly through the medium of the rod 196 and cam 198 compresses the spring 204 with the result that this spring tends to move the sleeve 197 as a unit with the rod when the latter is retracted or moved outwardly.

In order to strip the bushings off of the tubular portion 195 upon outward movement of the rod 196, it is desirable to momentarily prevent a corresponding movement of the sleeve 197, and, in the present instance, the spring 204 is prevented from immediately returning the sleeve by means of suitable latch mechanism 210. The latch mechanism comprises a dog 211 pivotally supported at the outer end as at 212 in a recess 213 formed in the bushing 205 and having a double-faced cam portion 214 at the free end thereof normally urged through a slot 215 by means of the leaf spring 216. The cam portion 214 at the free end of the dog engages a cam member 218 secured to the rod 196 within a recess 219 formed in the rod, and this cam member is fashioned to locate the free edge 220 of the dog in registration with the inner side 221 of the slot 215 so as to maintain the sleeve 197 stationary upon outward movement of the rod 196 and thereby effect the desired stripping action. As indicated above, the cam member 218 is fixed to the rod 196, and in order to provide for the required return movement of the sleeve 197 upon completion of the stripping operation, a cam surface 222 is formed on the cam member. The cam member engages the portion 214 of the dog 211 to move the edge 220 into the recess 213 in the bushing 205 out of registration with the inner side 221 of the slot 215. As soon as the edge 220 of the dog is moved out of registration with the adjacent side of the slot, the spring 204 operates through the collar and pin 208 to move the sleeve 197 outwardly until the collar 207 abuts a stop 223 formed on the stationary bushing 205. In this position of the parts, the side 221 of the slot 215 assumes a position beyond the free end of the dog and forms a stop to prevent movement of the dog under the action of the spring 216 until the rod 196 is again moved inwardly by the cam 198.

The bushings stripped from the tubular portion 195 of the stripper S are deposited on the guides T and U by the chutes V and W. As shown particularly in Figure 9, the chutes aforesaid are secured to a bracket 224 which in turn is fixed to a part of the machine frame, and the receiving ends of the chutes are so located with respect to the stripper that the chute V receives the first bushing to be stripped, while the chute W receives the second bushing to be stripped. The delivery end of the chute V communicates with the guide T, and the corresponding end of the chute W communicates with the guide U so it necessarily follows that the first bushing is deposited upon the guide T and the second bushing is deposited upon the guide U. The aforesaid guides are located a sufficient distance below the stripper S so as to provide for obtaining the required inclination of the chutes to permit feeding the bushings to the guides by gravity. The guides are also secured to the chutes and the discharge ends of the guides terminate in a position adjacent the turret X for the chamfering machine to be presently described.

As shown particularly in Figure 22, the bushings are advanced along the guides and forced into adjacent clamps on the turret X by means of the plungers Y and Z. Both of the aforesaid plungers are actuated as a unit with the plunger G by means of the same cam 38, and, in the present instance, this result is effected by securing the plungers Y and Z to the bracket 39 hereinbefore described as carrying the plunger G. The arrangement is such that during the interval the plunger G operates to transfer bushings from the turret E onto the stripper S, the plungers Y and Z function to move the bushings previously stripped by the device S along the guides into the turret X of the chamfering machine.

In view of the fact that the second bushing to be disengaged from the stripper S assumes a position in the guide U in advance of the first bushing stripped in the guide T, the plunger Z is sufficiently longer than the plunger Y to permit engagement thereof with the second bushing to be stripped at the same time the plunger Y engages the first bushing affording simultaneous movement of the bushings along their respective guides toward the turret X. In this connection attention is called to the fact that the guides are loaded with bushings in the manner shown in Figure 22 so as to provide for feeding bushings into the turret with the minimum stroke of the plungers. The bushings advanced toward the turret X are properly positioned within the clamps on the latter by means of a stop 225 located on the side of the turret X opposite the side upon which the plungers are positioned. In other words, the arrangement is such that the bushings are advanced by the plungers into the clamps on the turret X until the free ends of the bushings engage the stop 225. In order to compensate for any slight inaccuracy in the construction and more particularly to compensate for bushings of varying lengths both plungers are provided with telescopically engaging parts normally urged in their extended portions. In detail, the plunger Z is formed of two coaxially arranged sections 226 and 227. The inner section 226 of the plunger Z telescopically engages within the outer section 227 and is normally urged outwardly with respect to the section 227 of the plunger by means of a spring 228 located within the section 227 in the manner clearly shown in Figure 22. The spring 228 acts upon the outer end portion of the section through the medium of a plug 227' within the section 227 and the extent of this movement is restricted by means of a pin 228' extending transversely through the plug 227' with the extremities thereof engaging in diametrically opposed slots 229 formed in the section 227. The section 226 of the plunger is held in assembled relation with section 227 by means of a screw 230 having a head slidably engaging in a slot 230' in the section 227 of a length equal to the length of the slots 229. This construction provides for readily interchanging the sections 226 for bushings of varying lengths. In this connection, it is to be noted that the plunger Y is of the same construction as the plunger Z previously described so that bushings of various lengths may be accommodated without changing the stroke of the plungers or manually adjusting the effective lengths of the latter.

The turret X of the chamfering machine is keyed to a shaft 231 journaled in the chamfering machine frame attachment 232 and having a sprocket 233 also secured thereto. The sprocket 233 is driven by the shaft 67 through the medium of a sprocket 234 fixed to the shaft 67 and a chain 235 is reeved around said sprockets. Inasmuch as the shaft 67 of the turning machine actuates the turret E through the medium of the indexing mechanism or spacing dial 180, it necessarily follows that the turret X of the chamfering machine will be revolved as a unit with the turret E of the turning machine. In other words, by reason of the construction set forth above, a common indexing mechanism is provided for actuating both turrets.

The turret X of the chamfering machine is provided with twelve clamps 236 spaced 30° apart around the axis of rotation of the turret X so that upon completion of each indexing movement of 60°, a pair of the clamps 236 register with the plungers Y and Z.

Each of the twelve clamps 236 in the turret E is identical in construction and comprises cooperating jaw sections 237 for gripping the bushings. The inner jaw sections of the clamps are rigidly secured as at 238 to the turret X, while the outer jaw sections are carried by blocks 239 slidably supported in the periphery of the turret X for radial movement relative thereto and normally urged in a direction toward the inner jaw sections by means of suitable springs 240 in the manner clearly shown in Figure 24. With this arrangement, the bushings are automatically clamped between the jaw sections as soon as they are loaded into the turret by the plungers Y and Z. However, in order to insure proper clamping of the bushings in the jaws during the chamfering operations at stations C' and E', additional means is provided at these stations for urging the outer jaw sections toward the inner jaw sections. The means for accomplishing the above result is shown in Figure 24 as comprising a pair of plungers 241 and 242 located at the chamfering stations C' and E', respectively. The plungers are mounted within the chamfering machine frame for radial sliding movement with respect to the axis of rotation of the turret X, and the stroke of these plungers is such that upon inward movement thereof, the inner ends extend through radial openings 243 in the turret X for engaging the blocks 239 to urge the outer clamping sections into more intimate contact with the bushings. The plungers are actuated by complementary cams 244 and 245 fixed to a cam shaft 246 journaled in the chamfering machine frame. The cam 244 is operatively connected to the plunger 241 through the medium of a cam follower 247 having a roller 248 at the free end for engaging the surface of the cam 244 and operatively connected at the opposite end to one end of a rock arm 249 pivotally mounted intermediate the ends thereof on the chamfering machine frame as at 250 and having the opposite end connected to the plunger 241. The connection between the rock arm and cam follower is such as to compensate for variations in outside diameter of the bushings and comprises a pair of fixed stops 251 formed on the cam follower on opposite sides of the adjacent end of the rock arm 249. The stops are spaced from each other a sufficient distance to provide for limited oscillation of the rock arm relative to the cam follower, and, in the present instance, such oscillation is resisted by means of a spring 252 interposed between the innermost stop on the cam follower and the adjacent surface of the rock arm 249. The spring, cam follower and rock arm are held in assembled relation with each other by means of a suitable fastening element 253 anchored in the stops 251. The operative connection between the cam 245 and plunger 242 is identical to the connection just described between the cam 244 and plunger 241.

The operation of the plungers described above by the complementary cams also previously referred to, is effected in timed relation to the operation of the turret X so that during the interval of advancement of this turret, the plungers are withdrawn from the latter, and as soon as the turret comes to rest, the plungers are actuated to more firmly grip the bushings opposite the chamfering stations to prevent any possibility of displacement of the bushings during the chamfering operation. In order to provide for obtaining this timed relation, the cam shaft 246 of the chamfering machine is driven from the main cam shaft 37 of the turning machine. The operative connection between the two shafts comprises a sprocket 254 keyed to the shaft 246 and connected to a sprocket 255 on the cam shaft 37 through the medium of a chain 256.

As soon as the clamps on the turret X in registration with the plungers Y and Z are loaded by the latter, and these plungers have withdrawn to their inoperative positions, the turret X is advanced 60° to locate the bushing in the first clamp in registration with the chamfering station C'. The plunger 241 is then actuated by the cam 244 in the manner outlined above to urge the outer section of the clamp at the station C' into more intimate contact with the bushing whereupon suitable tools D' are moved toward opposite ends of the bushing to chamfer the inner and outer edges of the same. The mechanism for chamfering the bushing at station C' is shown in Figure 23 and comprises two spindles 257 arranged upon opposite sides of the turret X in axial alignment and rotatably mounted within suitable sleeves 258 which in turn are reciprocably supported in the chamfering machine frame. Although the spindles 257 are journaled in the sleeves 258, nevertheless, they are prevented from axial movement relative to these sleeves so that reciprocation of the sleeves effects a corresponding movement of the spindles. The sleeves 258 are reciprocated in the present instance by gears 259 secured to rockshafts 260 and meshing with rack teeth 261 formed integral with the sleeves 258. Suitable arms 262 are secured to the rockshafts 260, and the free ends of these arms are provided with rollers 263 for engaging cams 264 fixed to the cam shaft 246. The cams 264 are complementary and are so designed as to move the cutter heads 265 fixed to the inner ends of the spindles 257 toward each other to engage the tools 266 carried thereby with opposite ends of the bushing in timed relation to the operation of the turret X. In other words, as soon as the bushing is advanced to station C' and the clamp therefor is actuated by the plunger 241, the tools 266 are actuated to chamfer the inner and outer edges of opposite ends of the bushing by the complementary cams 264.

Upon completion of the operation of the tools 266 to chamfer opposite ends of the bushing, the cutter heads 265 are moved away from the bushing by the cams, and the turret is advanced another 60° to engage the bushing in the first clamp of the next adjacent pair with the chamfering station C' whereupon the above operation is repeated. During the interval the bushing in the first clamp of the second pair is being chamfered, the bushings in the first pair of clamps are maintained opposite an idle station, but as the turret is again advanced 60°, the second bushing of the first pair is registered with the chamfering station E' for the purpose of chamfering the opposite ends of this bushing. The chamfering mechanism at the station E' is identical to the chamfering mechanism at the station C', and, as shown particularly in Figure 23, the cutting tools on the spindles of the chamfering mechanism at the station E' are also moved into engagement with opposite ends of the bushing in registration therewith by the cams 264. In this connection, it is to be noted that the rockshafts 260 for actuating the gears 259 are merely extended and a second set of gears 270 are secured thereto for reciprocating the spindles of the chamfering mechanism at station E'. Thus, it will be observed that both chamfering stations operate simultaneously upon bushings in registration therewith, and for this reason, the plunger 242 is actuated at the same time as the plunger 241 to more rigidly clamp the bushings opposite the aforesaid stations. Each of the spindle assemblies associated with the chamfering stations C' and E' is provided with a micrometer device 271 for assisting in adjusting the cutter heads 265 to obtain a predetermined depth of cut. The micrometer devices 271 are identical in construction and operation so only one of these devices will be described in detail herein. As shown particularly in Figure 23, the aforesaid device comprises a stud 272 slidably mounted within an ear 273 fixed upon the chamfering machine frame and secured at the inner end thereof to a collar 274 which in turn is fixed to the inner end of the sleeve 258. Threaded upon the stud 272 adjacent the fixed ear 273 is an adjusting nut 275 forming a stop for engaging the ear 273. In the event it is desired to change the depth of cut of the chamfering tools, the connections between the rock arms 262 and rockshafts 260 are merely loosened, permitting the shafts to be rotated relative to the arms. Inasmuch as the shafts are connected to the spindles through the medium of the gears and sleeves 258, rocking movement of the shaft will vary the positions of the cutting tools 266 carried by the spindles relative to the ends of the bushings. Assuming, for example, that it is desired to move the cutter heads 265 outwardly with respect to the adjacent ends of the bushings, the adjusting nuts 275 are rotated in a direction to coact with the ears 273 to draw the spindles outwardly until the desired adjustment is obtained, whereupon the connections of the rock arms 262 with the rockshafts are again tightened. On the other hand, if it is desired to move the cutter heads inwardly toward the ends of the bushings, the adjusting nuts 275 are merely backed away from the ears 273 a distance equal to the desired inward travel of the tools, and the rockshafts 260 are rotated the extent necessary to reengage the adjusting nuts 275 with the ears.

The spindles of the chamfering devices at one side of the turret X are rotated by means of a belt 270' reeved around pulleys 271' keyed to the outer ends of the spindles and around a third pulley 272' which in turn is keyed to a drive shaft 273'. The spindles on the opposite side of the turret are also rotated by a belt 274' reeved around pulleys 275' keyed to the outer ends of these spindles and also around a pulley 276' fixed to a shaft 277'. The shaft 277' is journaled in the frame of the chamfering machine and is driven in an opposite direction from the shaft 273' by means of the gearing 278'. With this construction, it will be seen that the cutter heads on the chamfering spindles at one side of the turret X are rotated in a direction opposite to the cutter heads on the cooperating chamfering spindles at the opposite side of the turret X. In the present instance, the drive shaft 273' is driven from the turning machine by means of a belt 279' reeved around a pulley 280' fixed to the shaft 273' and also around a pulley 281' fixed to the drive shaft 88 of the turning machine.

Upon completion of the chamfering operation at station E', the turret is again advanced 60° to bring both the finished bushings in the first pair of clamps in registration with the unloading station F'. At this station the bushings in each pair of clamps are merely ejected out of the turret X, and this is accomplished herein by the pair of plungers G' carried by a common crosshead 276 which in turn is actuated by a cam 277 through the medium of suitable linkage. In detail, the linkage previously referred to comprises a rock arm 278 pivotally connected intermediate the ends thereof to the frame of the chamfering machine as at 279 and having the upper end pivotally connected to the crosshead 276 by means of a link 280. The lower end of the rock arm, on the other hand, is pivotally connected to the upper end of a lever 281 by means of a link 282, and the lower end of the lever 281 is secured to a rockshaft 283 which in turn is connected to the cam follower 284 by means of a link 285.

In the foregoing description of the invention particular stress has been placed upon the use of the chamfering machine to chamfer opposite ends of the bushings wherein the bushing blank in the station P on the dial E is severed into two bushings. It should be understood that the chamfering machine is equally applicable for use in association with the turning machine wherein bushing blanks of a length approximating the desired length of a single bushing are treated in the turning machine. In cases of this kind, only one bushing is unloaded at a time from the turret E at the station D, and it follows, therefore, that only one bushing will be stripped by the stripper S. Consequently, only one of the chutes T and U will be occupied by a bushing, with the result that bushings will be loaded into every other one of the clamps on the turret X and only one of the two chamfering stations C' and E' will be employed. With the exception of the above, the operation of the machine is identical irrespective of whether one or two bushings are unloaded at the station D of the turning machine, and the present invention contemplates such an arrangement.

Figure 4:
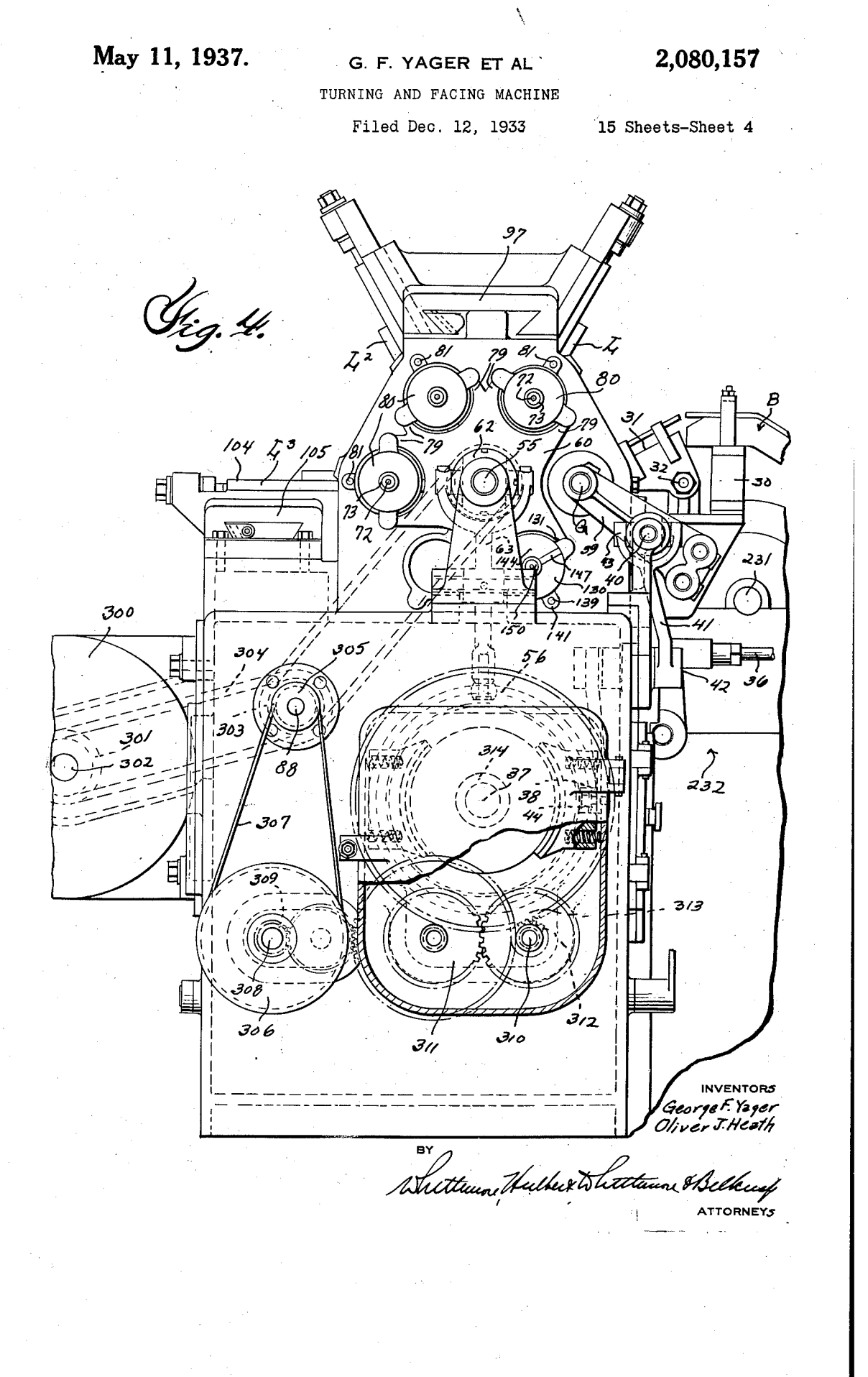

Referring now more in detail to the driving means for the apparatus described above and with special reference to Figure 4, it will be noted that we provide a motor 300 having a sprocket 301 on the drive shaft 302 thereof connected to a corresponding sprocket 303 (shown in Figure 7 as secured to the drive shaft 88) by means of a chain 304. The drive shaft 88 projects beyond one end of the machine and has secured thereto a pulley 305 shown in Figure 4 as connected to a pulley 306 by means of a belt 307. The pulley 306 is secured to a stub shaft 308 having a gear 309 secured thereto and operatively connected to a clutch shaft 310 through the medium of reduction gearing designated generally herein by the reference character 311. Journaled upon the clutch shaft 310 is a gear 312 arranged in constant mesh with a gear 313 mounted upon the main cam shaft 37 and secured thereto for driving the same by means of a hub 314 keyed to the cam shaft 37 and connected to the hub of the gear 313 by shear pins 315. It has been previously stated that the gear 312 is journaled upon the clutch shaft 310, so it necessarily follows that before the cam shaft 37 can be rotated by the gear 312, the latter must be secured to the clutch shaft, and this is accomplished herein by a clutch designated generally herein by the reference character 316. In detail, the clutch 316 is provided with a hub section 317 splined upon the clutch shaft for sliding movement axially of the latter relative to the gear 312 and having clutch teeth 318 thereon for engaging corresponding clutch teeth 319 carried by the hub of the gear 312. Axial sliding movement of the clutch 316 is effected by a rock arm 320 having the upper end operatively engaging the clutch and having the lower end fixed to a rock shaft 321 which in turn is operated from a point exteriorly of the machine by a lever 322.

The functions of the main drive shaft 88 and main cam shaft 37 to operate the working parts of the apparatus has been clearly defined above, and it should be understood that the driving connections between these two shafts and the motor are carefully designed so as to insure rotation of the shafts at their proper speeds. It will also be apparent from the foregoing description that the chamfering machine attachment is a component part of the turning and facing machine and that the several working parts thereof are actuated by the main drive and cam shafts 88 and 37, respectively.

To describe the operation of the machine at this point would merely be a repetition of the definition of the function of the apparatus set forth in the portion of the specification preceding the detailed description, and, accordingly, reference is made to this portion of the specification for an understanding of the complete operation.

What we claim as our invention is:

1. In a metal working machine, a turret carrying a plurality of clamps for securing articles to be worked in assembled relation therewith, a work performing station predeterminedly located with respect to the turret, means for indexing the turret to successively register the articles carried thereby with the work performing station, means at the aforesaid station operable in timed relation to the indexing movement of the turret for engaging the article in registration with said station to revolve the same, and means for disengaging the clamp from the aforesaid article in timed relation to engagement of the revolving means with said article.

2. In a metal working machine, a turret carrying a plurality of clamps for securing the articles to be worked in assembled relation therewith, a plurality of work performing stations predeterminedly located with respect to the turret, means for indexing the turret to successively register the articles with said stations, means located at each of the aforesaid stations and operable in timed relation to the indexing movement of the turret for engaging the articles in registration therewith to revolve the same around their respective axes, and means operable in timed relation to both the indexing movement of the turret and operation of said revolving means for releasing the clamps from the articles in registration with said stations.

3. In a metal working machine, a turret carrying a plurality of clamps for securing the articles to be worked in assembled relation therewith, a plurality of work performing stations predeterminedly located with respect to the turret, means for indexing the turret to successively register the articles carried thereby with the aforesaid stations, means at each of said stations operable in timed relation to indexing the turret for engaging the articles in registration therewith to revolve the same, means for releasing the clamps from the articles in registration with said stations prior to the actuation of said revolving means to rotate the articles and means interposed between said stations for repositioning the articles during advancement thereof by the turret.

4. In a metal working machine, a turret, means carried by the turret for securing a plurality of articles thereto including a series of clamps normally yieldably urged into engagement with the articles, a work performing station predeterminedly located with respect to the turret, means for indexing the turret to successively register the articles with said station, means at the station operable in timed relation to the indexing movement of the turret for rotating the articles, means for releasing the clamps engaging the articles prior to rotation of the latter by the last named means and for reengaging the clamp with the articles upon completion of said revolving means.

5. In a metal working machine, a turret carrying a plurality of clamps for securing the articles to be worked in assembled relation therewith, a work performing station predeterminedly located with respect to the turret, means for indexing the turret to successively register the articles with said stations, revolvable members at each of said stations upon opposite sides of the path of travel of the turret, means for moving said members toward each other into engagement with opposite ends of the articles in timed relation to the indexing movement of the turret, means for releasing the articles from the turret prior to the engagement of the aforesaid members with the articles, and work performing tools operable in timed relation to the rotation of the articles by said members for fashioning the latter.

6. In a metal working machine, a turret carrying means for securing a plurality of articles to be worked in assembled relation thereto, work performing stations predeterminedly located with respect to the turret, means for indexing the turret to successively register the articles with said stations, revolvable spindles at each of said stations upon opposite sides of the path of travel of the articles by the turret and axially movable into and out of engagement with opposite ends of the articles in registration therewith, means for simultaneously actuating said spindles, tools also located at each of said stations for engaging the articles, and means for simultaneously actuating the tools in timed relation to rotation of the articles by the spindles.

7. In a metal working machine, a turret having means for holding a bushing blank, work performing stations predeterminedly located with respect to the turret, means for indexing the turret to successively register the bushing blank with said stations, means at one of the stations operable in timed relation to the indexing movement of the turret for severing the bushing blank into a plurality of parts, means at another of said stations also operable in timed relation to the indexing movement of the turret for ejecting the parts, and means operable upon completion of the operation of the last named means for transferring the parts into a second work holding turret.

8. In a metal working machine, a turret having means for holding a bushing blank, work performing stations predeterminedly located with reference to the turret, means for indexing the turret to successively register the bushing blank with said stations, tools located at certain of said stations and movable toward and away from the bushing blank in registration with the latter, means at another of said stations for severing the bushing blank into a plurality of parts upon the completion of the operation of the aforesaid tools on the bushing blank, means at still another of said stations for ejecting the severed parts of the blank from the turret, and means for actuating said tools and both of said last named means simultaneously in timed relation to the indexing movement of the turret.

9. In a metal working machine, a plurality of turrets having means for successively holding an article to be fashioned, work performing stations predeterminedly located with respect to each turret, means for indexing each turret to successively register the article carried thereby with the stations adjacent thereto, means associated with one station adjacent one of the turrets to sever the article in registration therewith, means at another of the stations adjacent the last named turret for ejecting the severed parts of the article from this turret, means for transferring the severed parts into another of said turrets, and means at the stations adjacent the last named turret for performing additional operations on said severed parts.

10. In a metal working machine, a turret having means for securing an article to be fashioned thereto, work performing stations predeterminedly located with respect to said turret, means for indexing the turret to successively register the article with said stations, tools at each of said stations substantially parallel to the plane of rotation of said turret and movable into and out of engagement with said article, and means for actuating all of said tools in timed relation to the indexing means, including rotary means, and reciprocating means actuable by said rotary means.

11. In a metal working machine, a turret having means for securing a plurality of articles to be fashioned thereto, work performing stations predeterminedly located with respect to said turret, means for indexing the turret to successively register the articles with said stations, tools at each of said stations substantially parallel to the plane of rotation of said turret and movable into and out of engagement with said articles, a cam shaft substantially parallel to the axis of rotation of said turret, a cam on said shaft, and means actuable by said cam for simultaneously actuating all of said tools in timed relation to the indexing means.

12. In a metal working machine, a turret having means for securing a plurality of bushing blanks thereto, stations predeterminedly located with respect to said turret, means for indexing said turret to successively register the blanks thereon with said stations, means at one of said stations for severing the blanks into a plurality of bushings, means at another of said stations for ejecting the bushings from the turret, a second turret operatively connected to the turret aforesaid for movement therewith as a unit and having means for holding bushings thereon, means for transferring the bushings ejected from the first turret into the holding means associated with the second turret, and means operable in timed relation to the operation of said second turret to perform additional operations upon the bushings.

13. In a metal working machine, a turret having means for securing a plurality of bushing blanks thereto, stations predeterminedly located with respect to said turret, means for indexing said turret to successively register the blanks thereon with said stations, means at one of said stations for severing the blanks into a plurality of bushings, means at another of said stations for ejecting the bushings from the turret, a second turret operatively connected to the turret aforesaid for movement therewith as a unit and having means for holding bushings thereon, means for transferring the bushings ejected from the first turret into the holding means associated with the second turret, work performing stations positioned for registration with the bushings on said second turret, means at the latter stations for performing certain operations on the bushings in registration therewith, and means for actuating the means at all of said stations simultaneously in timed relation to the indexing means for said turrets.

14. In a metal working machine, a turret having a plurality of work holding clamps thereon, stations predeterminedly located with respect to said turret, mechanism for indexing said turret to successively register the clamps with said stations, means at certain of said stations for fashioning the work in registration therewith, means at another of said stations for ejecting the work from the turret, means movable to a position for receiving the work ejected, means for stripping the work from the latter means and means for actuating all of the foregoing means in timed relation to the operation of said indexing mechanism.

15. In a metal working machine, a turret having means for holding a plurality of bushing blanks to be fashioned thereon, stations predeterminedly located with respect to said turret, mechanism for indexing said turret to successively register the bushing blanks with said stations, means at one of said stations for severing the blanks into a plurality of sections, means at another of the stations for ejecting the sections from said turret, means movable to a position for receiving the sections ejected, guides corresponding in number to the number of said sections and predeterminedly located with respect to the receiving means, means for stripping the sections from the receiving means to deposit one section on each guide and means for advancing the sections on the respective guides into a second work holding turret supported in operative relation thereto.

16. In a metal working machine, a turret having means for holding a plurality of bushing blanks to be fashioned thereon, stations predeterminedly located with respect to said turret, mechanism for indexing said turret to successively register the bushing blanks with said stations, means at one of said stations for severing the blanks into a plurality of sections, means at another of the stations for ejecting the sections from said turret, means movable to a position for receiving the sections ejected, guides corresponding in number to the number of said sections and predeterminedly located with respect to the receiving means to deposit one section on each guide, a second turret operatively connected to the turret aforesaid for movement as a unit therewith and having work holding means successively registrable with the delivery ends of the guides, means for advancing the sections on the guides into the work holding means of the second turret, work performing means associated with the second turret for fashioning the sections carried thereby, and means for actuating all of the foregoing means in timed relation to the operation of the indexing mechanism.

17. In a metal working machine, a turret having a plurality of work holding clamps thereon, stations predeterminedly located with respect to said turret, mechanism for indexing said turret to successively register the clamps with said stations, means at certain of said stations for fashioning the work in registration therewith, means at another of said stations for ejecting the work from the turret, means movable to a position for receiving the work ejected, a guide predeterminedly located with respect to the receiving means, means for stripping the work from said receiving means to deposit the same on said guide, a second turret operatively connected to the turret aforesaid for movement as a unit therewith and having work holding means successively registrable with the delivery end of the guide, means for advancing the work on the guide into the work holding means of the second turret, means associated with the second turret for fashioning the work and means for actuating all of the foregoing means in timed relation to the operation of said turrets.

18. In a metal working machine, a turret having means for holding a plurality of articles to be fashioned in assembled relation thereto, a work performing station predeterminedly located with respect to the turret, means for indexing the turret to successively register the articles carried thereby with said station, aligned revolvable arbors at said station on opposite sides of the path of travel of the articles by the turret and movable toward and away from opposite ends of the article in registration therewith, spindles associated with each of said arbors for rotation therewith as a unit and having flexible portions insertable into opposite ends of the article upon movement of the arbors toward the latter, and means for expanding the flexible portions of the spindles in timed relation to the movement of the same within the articles.

19. In a metal working machine, a turret having means for holding a plurality of bushing blanks in assembled relation thereto, a work performing station predeterminedly located with respect to the turret, mechanism for indexing the turret to successively register the bushing blanks with said station, aligned revolvable arbors at said station upon opposite sides of the path of travel of the bushing blanks by the turret and movable toward and away from opposite ends of the bushing blanks in timed relation to the operation of the indexing mechanism, spindles carried by the arbors and having portions insertable into opposite ends of the bushing blanks upon movement of the arbors toward the latter ends, and means for expanding said portions within the bushing blanks to secure the latter to the spindles.

20. In a metal working machine, a turret having means for holding a plurality of bushing blanks in assembled relation thereto, a work performing station predeterminedly located with respect to the turret, means for indexing the turret to successively register the bushing blanks with said stations, aligned revolvable arbors disposed upon opposite sides of the path of travel of the bushing blanks by the turret at the aforesaid station and movable toward and away from opposite ends of the bushing blanks in registration therewith in timed relation to the operation of the indexing means, a spindle carried by each of said arbors and having portions insertable into opposite ends of the bushing blanks upon movement of the arbors toward the latter, means for expanding the portions aforesaid of the spindles to secure the bushing blanks thereto, and means also associated with each of said arbors for stripping the bushing blanks from the spindles upon movement of the arbors in directions away from the bushing blanks.

21. In a metal working machine, a turret having means for holding a plurality of bushing blanks in assembled relation thereto, a work performing station predeterminedly located with respect to the turret, means for indexing the turret to successively register the bushing blanks with said stations, aligned revolvable arbors at said stations upon opposite sides of the path of travel of said bushing blanks by the turret and movable toward and away from opposite ends of the bushing blanks in timed relation to the operation of the indexing means, a spindle carried by each arbor having pilot portions movable into opposite ends of the bushing blank in registration therewith upon movement of the arbors toward each other, and means carried by the spindles for engagement with opposite ends of the bushings to effect a driving engagement between the latter and spindles.

22. In a metal working machine, a turret having means for holding a plurality of bushing blanks in assembled relation thereto, a work performing station predeterminedly located with respect to the turret, means for indexing the turret to successively register the bushing blanks with said stations, aligned revolvable arbors at said stations upon opposite sides of the path of travel of said bushing blanks by the turret and movable toward and away from opposite ends of the bushing blanks in timed relation to the operation of the indexing means, a spindle carried by each arbor having pilot portions movable into the ends of the bushing blank in registration therewith upon movement of the arbors toward each other and means for stripping the bushing blank from the pilot portions upon movement of the arbors in directions away from each other.

23. In a metal working machine, a work holding member, a member for receiving work from said holding member, a draw rod fixed to said receiving member and movable toward and away from said holding member, a sleeve slidable on said rod and engageable with work carried by the receiving member to strip said work from said member, a cam, a connection between said cam and rod operable to move the rod and including an element for moving the sleeve in unison with the rod upon movement of the rod toward the work holding member, a latch member for momentarily holding the sleeve stationary relative to the rod and moving element aforesaid upon movement of the rod away from the holding member whereby work carried by said receiving member will be stripped therefrom, means operable after the work has been stripped for releasing the latch member, and means operable when the latch member is released for moving the sleeve away from the holding member into operative relation with the moving element aforesaid.

24. In a metal working machine, a work holding member, a member for receiving work from said holding member, a draw rod fixed to said receiving member and movable toward and away from said holding member, a sleeve slidable on said rod and engageable with work carried by the receiving member to strip said work from said member, a cam, a connection between said cam and rod operable to move the rod and including an element for moving the sleeve upon movement of the rod toward the work holding member, and a latch member for momentarily holding the sleeve stationary relative to the rod upon movement of the latter away from the holding member whereby work carried by said receiving member will be stripped therefrom.

25. In a metal working machine, a turret, work holding means carried by said turret, a stripper device slidably supported beside the turret, a plunger operable to transfer work from the work holding means to the stripper device, means for guiding the work from the stripper device into another turret, and means operable during the interval the plunger aforesaid operates to move the work from the stripper device along said guiding means.

26. In a metal working machine, a turret, work holding means carried by said turret, means for moving work into engagement with said holding means, and means for positioning the work properly relative to said holding means including aligned plungers upon opposite sides of the path of travel of the work in said holding means, and cam members carried by said plungers and engageable with said work.

27. In a metal working machine, a shaft, a turret on said shaft, a spacing dial on said shaft and having slots in its periphery, a dog engageable with said slots, and means for indexing the turret to successively register work carried thereby with suitable work stations, including a pawl also successively engageable with said slots, a rock arm for said pawl, a cam actuated arm, a link connected to said arms, means carried by the link for moving the dog so that it will be released from a slot in the dial prior to actuation thereof by said pawl, and means also carried by said link for causing re-engagement of the dog with a slot in the dial after the latter has been actuated by the pawl to prevent accidental movement of the turret by the dial.

28. In a metal working machine, a work engaging arbor, a tool holder slidable radially relative to the axis of rotation of said arbor, said holder having a counterbored recess and a slot therein, a plunger slidably mounted in the recess and projecting exteriorly of said holder, a stop for the plunger, a cam, and a driving connection between said cam and holder including a lever operable by said cam and engaging said slot, and a spring in said recess between the plunger and an end of said recess.

29. In a metal working machine, a movable tool holder, and actuating means for said holder including a yieldable element, a cam, a lever, and a follower for said cam carried by said lever and held in engagement with the cam by the yieldable element aforesaid.

30. In a metal working machine, an axially movable work engaging arbor having a spindle, and actuating means for the arbor including a head on the spindle provided at substantially diametrically opposite points of the spindle with slots, portions of the head being at one side of said slots, yieldable means upon the other side of said slots, a slidable shaft, and a spider on said shaft having ears extending through the slots in said head whereby movement of the shaft in one direction will cause the drive from the spider to the head to be through said yieldable means, and movement of the shaft in the other direction will cause the drive from the spider to be direct from the ears to the portions aforesaid of the head.

31. In a metal working machine, a turret, work clamping jaws carried by said turret, yieldable means urging the jaws into work clamping position, means for moving the jaws against the tension of said yieldable means to release the work including a plate movable relative to said turret, work performing stations predeterminedly located with respect to the turret, arbors at certain of said stations engageable with the work upon movement of the plate in a direction to cause the work to be released by said jaws and movable away from the work upon movement of the plate in a direction to permit re-engagement of the jaws with the work, and means for actuating said arbors and plate.

32. In a metal working machine, a turret, work clamping jaws carried by said turret, yieldable means urging the jaws into work clamping position, and means for separating the jaws against the tension of the yieldable means to release the work, including a plate movable axially relative to the turret, lugs carried by said jaws and having cam faces, and pins carried by said plate and engageable with said cam faces.

33. In a metal working machine, a turret, work clamping jaws carried by said turret, yieldable means urging the jaws into work clamping position, a slidable shaft mounted in axial alignment with the axis of rotation of said turret, and means for separating the jaws against the tension of the yieldable means to release the work including a plate on said shaft, cam members carried by said jaws, and means carried by said plate and engageable with said cam members.

34. In a metal working machine, a work engaging arbor having a spindle, a head on said spindle, adjustable stops in said head at diametrically opposite sides of said spindle, and actuating means for said arbor including a slidably mounted shaft, and a spider on said shaft having ears extending into said head upon diametrically opposite sides of said spindle between a fixed part of said head and said adjustable stops.

35. In a metal working machine, a work engaging arbor having a spindle, a head on said spindle, an adjustable stop in said head, actuating means for the arbor including a slidably mounted shaft and a spider on said shaft having an ear extending into said head between a fixed part thereof and said adjustable stop, and yieldable means disposed within said head between said ear and stop.

36. In a metal working machine, a turret, means carried by said turret for gripping work, a slidable shaft, and actuating means for the work gripping means carried by said slidable shaft and rendered effective and ineffective during sliding movement of said shaft.

37. In a metal working machine, a cam, a turret, means carried by the turret for gripping work, a slidable shaft, actuating means for the work gripping means carried by said slidable shaft and rendered effective and ineffective during sliding movement of said shaft, and a driving connection between the cam aforesaid and said slidable shaft.

38. In a metal working machine, an arbor having a spindle and a member provided with means capable of being expanded within a bushing to secure the latter to said spindle, and means for expanding said expansible means including a draw rod extending axially of the spindle and having two sections, one section of said rod having a portion for expanding the expansible means when the member and portion are moved, the said section aforesaid being movable by the other section of said rod, and said sections being adjustably connected together whereby the effective lengths of the rod may be varied to compensate for bushings of different lengths.

39. In a metal working machine, an arbor having a spindle and a member provided with means capable of being expanded within a bushing to secure the latter to said spindle, and means for expanding said expansible means including a draw rod extending axially of the spindle and having two sections, one section of said rod having a portion for expanding the expansible means when the member and portion are moved, the said section aforesaid being movable by the other section of said rod.

40. In a metal working machine, a cam, a turret, means carried by the turret for gripping work, a slidable shaft, actuating means for the work gripping means carried by said slidable shaft and rendered effective and ineffective during sliding movement of said shaft, a driving connection between the cam aforesaid and said slidable shaft, two sets of arbors for engagement with the work as the gripping means aforesaid is rendered ineffective, one set being upon one side of the turret and actuable by the cam aforesaid, the other set being upon the opposite side of the turret, a second cam, and a driving connection between the second cam and second set of arbors.

41. In a metal working machine, an arbor having a spindle mounted for sliding and rotary movements, and having means operable upon sliding movement of the spindle to grip a bushing, said means being mounted within an end of the spindle and having a portion for insertion within an end of a bushing, said portion being capable of being expanded within such bushing to secure the latter to the spindle.

42. In a metal working machine, a turret, yieldable means on the turret for gripping work, brackets carried by said turret, and means for positioning the work properly in said gripping means including plungers carried by said brackets, and cam members carried by said plungers and engageable with the work in the gripping means aforesaid.

43. In a metal working machine, a turret, work holding means carried by said turret, means for moving work into engagement with said holding means, and means for positioning the work properly relative to said holding means including aligned plungers upon opposite sides of the path of travel of the work in said holding means, and work engaging means carried by said plungers.

44. In a metal working machine, a movable tool holder, a fixed stop, and actuating means for said holder including a plunger engaging said stop, a yieldable element between the plunger and holder urging the latter away from the stop, a rotary cam, and a lever connected to the holder and actuable by said cam for moving the holder against the tension of said yieldable element.

45. In a metal working machine, a plurality of cooperating jaws for gripping work, and actuating means for said jaws including a plate movable relative to said jaws, lugs on said jaws having inclined faces forming cams, and pins carried by said plate and having frusto-conical portions engageable with the cams aforesaid.

46. In a metal working machine, a turret, means carried by the turret for gripping work, a slidable shaft in axial alignment with the axis of rotation of the turret, a plate fixed on said shaft, and means carried by said plate and operable upon sliding movement of said shaft toward said turret to actuate said gripping means.

47. In a metal working machine, a rotary cam, a turret, means carried by the turret for gripping work, a slidable shaft in axial alignment with the axis of rotation of the turret, actuating means for the work gripping means carried by said slidable shaft and rendered effective and ineffective during sliding movement of said shaft, a driving connection between the cam aforesaid and said slidable shaft to effect sliding movement of the shaft, arbors for engagement with the work as the gripping means aforesaid is rendered ineffective, and a driving connection between the cam aforesaid and said arbors.

48. In a metal working machine, a rotary cam, a turret, means carried by the turret for gripping work, a slidable shaft in axial alignment with the axis of rotation of the turret, actuating means for the work gripping means carried by said slidable shaft and rendered effective and ineffective during sliding movement of said shaft, a driving connection between the cam aforesaid and said slidable shaft to effect sliding movement of the shaft, two sets of arbors for engagement with the work as the gripping means aforesaid is rendered ineffective, one set being upon one side of the turret and actuable by the cam aforesaid, the other set being upon the opposite side of the turret, a second rotary cam complementary to the cam aforesaid, and a driving connection between the second cam and second set of arbors.

49. In a metal working machine, an arbor having a spindle mounted for sliding and rotary movements, and having a member operable upon sliding movement of the spindle to grip a bushing, said member being threadedly mounted within an end of the spindle and having a tubular portion for insertion within an end of a bushing, the end of said tubular portion being slotted in the direction of the axis of the spindle and providing fingers capable of being expanded within a bushing to secure the latter to the spindle.

50. In a metal working machine, an arbor having a spindle and a member provided with fingers capable of being expanded within a bushing to secure the latter to the spindle, and means for expanding said fingers, including a draw rod extending axially of the spindle and having two sections, an end of one section of said rod having an enlarged substantially frusto conical head for engaging said fingers to expand the latter when the member and head are relatively axially moved in opposite directions, the said section aforesaid being movable by the other section of said rod, and said sections being adjustably connected together whereby the effective lengths of the rod may be varied to compensate for bushings of different lengths.

51. In a metal working machine, the combination with a frame, of an arbor carried by said frame and including a spindle mounted for sliding and rotary movements, a stop carried by said frame, a collar carried by the spindle for engagement with said stop, a head connected to said collar, and actuating means for said arbor including a slidably mounted shaft, an adjustable stop in said head, and a member on said shaft having a projection extending into said head between a fixed part thereof and said adjustable stop.

52. In a metal working machine, the combination with a frame, of an arbor carried by said frame and including a spindle mounted for sliding and rotary movements, a stop carried by said frame, a collar carried by the spindle for engagement with said stop, and a driving head connected to said collar, the connection between said head and collar being of the lost motion type permitting a predetermined travel of the head relative to the collar after the latter engages the stop.

53. In a metal working machine, a frame, a work holder, a tool holder mounted for sliding movement in said frame relative to the work holder, means limiting sliding movement of the tool holder including a stop carried by the frame and a pin carried by the frame and engaging a slot in said tool holder, and means urging the tool holder away from said stop including a plunger in the tool holder engaging said stop, and a spring between the plunger and a part of said tool holder.

54. In a metal working machine, a frame, a work holder, a tool holder mounted for sliding movement in said frame relative to the work holder, a spring urging the tool holder toward the work holder, and means for moving the tool holder away from the work holder including a rotary cam, a lever carried by said frame and having a slotted connection with the tool holder, and a follower for said cam carried by said lever.

55. In a metal working machine, a turret, yieldable means on the turret for gripping work, brackets upon opposite sides of said turret, and means for positioning the work properly in said gripping means including aligned plungers carried by said brackets upon opposite sides of the turret, said plungers being axially adjustably mounted within said brackets, and cam members carried by said plungers and engageable with opposite ends of the work in the gripping means aforesaid.

56. In a metal working machine, a rotary shaft, a turret on said shaft, work gripping means carried by said turret, six stations spaced equal distances from each other concentrically relative to the axis of rotation of said turret, and indexing mechanism for moving the turret so that the gripping means will be advanced successively from one station to another, including a dog, a spacing dial on the shaft aforesaid having six slots in its periphery spaced 60° apart and successively engageable with said dog, the arrangement being such that when the dial is latched against rotation by engagement of the dog with any one of said slots the work gripping means will assume positions in registration with the stations about the turret.

57. In a metal working machine, a rotary shaft, a turret on said shaft, work gripping means carried by said turret, six stations spaced equal distances from each other concentrically relative to the axis of rotation of said turret, and indexing mechanism for moving the turret so that the gripping means will be advanced successively from one station to another, including a dog, a spacing dial on the shaft aforesaid having six slots in its periphery spaced 60° apart and successively engageable with said dog, said dog being released automatically from the dial in timed relation to movement of the dial throughout its angular travel of 60°.

58. In a metal working machine, a rotary shaft, a turret on said shaft, work gripping means carried by said turret, six stations spaced equal distances from each other concentrically relative to the axis of rotation of said turret, and indexing mechanism for moving the turret so that the gripping means will be advanced successively from one station to another, including a dog, a spacing dial on the shaft aforesaid having six slots in its periphery spaced 60° apart and successively engageable with said dog, and means for advancing the dial throughout the aforesaid degree of angular travel, including a pawl also successively engageable in the slots aforesaid.

59. In a metal working machine, a rotary shaft, a turret on said shaft, and indexing mechanism for said turret including a dog having an extension, a spacing dial on the shaft having slots in its periphery and successively engageable with said dog, means for advancing the dial including a pawl also successively engageable with said slots, a link for actuating said pawl, and means for releasing the dog from the dial prior to actuation of the dial by the pawl including a stop on said link engageable with the extension of said dog.

60. In a metal working machine, a rotary shaft, a turret on said shaft, and indexing mechanism for said turret including a dog having two extensions, a spacing dial on the shaft having slots in its periphery and successively engageable with said dog, means for advancing the dial including a pawl also successively engageable with said slots, a link for actuating said pawl, means for releasing the dog from the dial prior to actuation of the dial by the pawl including a stop on the link engageable with one of said extensions, and means for re-engaging the dog with the dial, including a spring pressed plunger on the link engageable with the other extension of the dog.

61. In a metal working machine, a frame, and a work stripping device carried by the frame and including a part for carrying the work, a draw rod fixed to said part, a sleeve on said rod for stripping work from said part, a bushing in spaced relation to a part of said frame, said collar being connected to said sleeve, a spring on the bushing between said collar and said part of the frame and urging movement of the sleeve with said rod, actuating means for said rod including means for moving said sleeve against the tension of said spring, and means for momentarily holding the sleeve against movement upon movement of the rod to cause work carried by the part aforesaid to be stripped therefrom, including means for preventing the spring from immediately returning the sleeve to its initial position.

62. In a metal working machine, a work stripping device including a part for carrying the work, a rod for actuating said part, a sleeve for stripping the work from said part, said sleeve being movable in unison with and relative to said rod, a bushing for said sleeve, a spring for urging movement of the sleeve with said rod, actuating means for said rod including means for moving the sleeve against the tension of said spring, means for momentarily holding the sleeve against movement upon movement of the rod to cause work carried by said part to be stripped therefrom including a dog carried by the bushing and engageable with said sleeve, said dog having a cam portion, and a cam member carried by the rod and engageable with the cam portion of said dog during movement of said rod to disengage the dog from said sleeve and permit the latter to be returned by said sleeve to its initial position.

63. In a metal working machine, a work stripping device including a part for carrying the work, a rod for actuating said part, a sleeve for stripping the work from said part, said sleeve being movable in unison with and relative to said rod, a spring for urging movement of the sleeve with said rod, actuating means for said rod including means for moving the sleeve against the tension of said spring, means for momentarily holding the sleeve against movement upon movement of the rod to cause work carried by said part to be stripped therefrom, including a dog engageable with said sleeve, said dog having a cam portion, and a cam member carried by the rod and engageable with the cam portion of said dog during movement of said rod to disengage the dog from said sleeve and permit the latter to be returned by said spring to its initial position.

64. In a metal working machine, a work engaging arbor having a spindle, a head on said spindle, adjustable stops carried by said head at diametrically opposite sides of said spindle, and actuating means for said arbor including a slidably mounted shaft, and a spider on said shaft having portions upon diametrically opposite sides of said spindle between a fixed part of said head and said adjustable stops.

65. In a metal working machine, a work engaging arbor having a spindle, a head on said spindle, an adjustable stop carried by said head, actuating means for the arbor including a slidably mounted shaft, and a spider on said shaft having a portion between a fixed part of said head and said adjustable stop, and yieldable means carried by said head between said portion and stop.

66. In a metal working machine, a plurality of cooperating jaws for gripping work, and actuating means for said jaws including yieldable means tending to close said jaws, a member movable relative to said jaws, projections on said jaws having inclined faces forming cams, and means carried by said member and engageable with the cams aforesaid to open said jaws.

67. In a metal working machine, a turret, means carried by said turret for gripping work, a slidable shaft in axial alignment with the axis of rotation of said turret, and actuating means for the work gripping means carried by said slidable shaft and rendered effective and ineffective during sliding movement of said shaft.

68. In a metal working machine, a rotary cam, a turret, means carried by the turret for gripping work, a slidable shaft in axial alignment with the axis of rotation of the turret, actuating means for the work gripping means carried by said slidable shaft and rendered effective and ineffective during sliding movement of said shaft, and a driving connection between the cam aforesaid and said slidable shaft to effect a sliding movement of the shaft.

69. In a metal working machine, an arbor having a spindle and a member provided with fingers capable of being expanded within a bushing to secure the latter to the spindle, and means for expanding said fingers, including a draw rod extending axially of the spindle and having two sections, an end of one section of said rod having a portion for expanding the fingers when the member and portion are relatively axially moved in opposite directions, the said section aforesaid being movable by the other section of said rod, and said sections being adjustably connected together whereby the effective lengths of the rod may be varied to compensate for bushings of different lengths.

70. In a metal working machine, a rotary shaft, a turret on said shaft, work gripping means carried by said turret, stations spaced from each other concentrically relative to the axis of rotation of said turret, and indexing mechanism for moving the turret so that the gripping means will be advanced successively from one station to another, including a dog, a spacing dial on the shaft aforesaid having spaced slots in its periphery successively engageable with said dog, the arrangement being such that when the dial is latched against rotation by engagement of the dog with any one of said slots the work gripping means will assume positions in registration with the stations about the turret.

71. In a metal working machine, a rotary shaft, a turret on said shaft, work gripping means carried by said turret, stations spaced from each other concentrically relative to the axis of rotation of said turret, an indexing mechanism for moving the turret so that the gripping means will be advanced successively from one station to another, including a dog, a spacing dial on the shaft aforesaid having spaced slots in its periphery successively engageable with said dog, said dog being released automatically from the dial in timed relation to movement of the dial throughout its angular travel.

72. In a metal working machine, a rotary shaft, a turret on said shaft, work gripping means carried by said turret, stations spaced from each other concentrically relative to the axis of rotation of said turret, and indexing mechanism for moving the turret so that the gripping means will be advanced successively from one station to another, including a dog, a spacing dial on the shaft aforesaid having spaced slots in its periphery successively engageable with said dog, and means for advancing the dial throughout its angular travel, including a pawl also successively engageable in the slots aforesaid.

73. In a metal working machine, a rotary shaft, a turret on said shaft, and indexing mechanism for said turret including a dog having an extension, a spacing dial on the shaft having slots in its periphery and successively engageable with said dog, means for advancing the dial including a pawl also successively engageable with said slots, means for actuating said pawl, and means for releasing the dog from the dial prior to actuation of the dial by the pawl including a stop carried by the pawl actuating means and engageable with the extension of said dog.

GEORGE F. YAGER.
OLIVER J. HEATH.